(12) United States Patent
Dazzi

(10) Patent No.: US 8,769,139 B2
(45) Date of Patent: Jul. 1, 2014

(54) EFFICIENT STREAMING SERVER

(75) Inventor: Alain Dazzi, San Jose, CA (US)

(73) Assignee: Clarendon Foundation, Inc., Murray, UT (US)

( * ) Notice: Subject to any disclaimer, the term of this patent is extended or adjusted under 35 U.S.C. 154(b) by 467 days.

(21) Appl. No.: 12/973,646

(22) Filed: Dec. 20, 2010

(65) Prior Publication Data

US 2011/0191445 A1  Aug. 4, 2011

Related U.S. Application Data

(60) Provisional application No. 61/299,459, filed on Jan. 29, 2010.

(51) Int. Cl.
*G06F 15/16* (2006.01)

(52) U.S. Cl.
USPC ............................................ 709/231; 709/203

(58) Field of Classification Search
CPC ................................................. H04L 29/06476
USPC .................................. 709/231, 203, 217–219
See application file for complete search history.

(56) References Cited

U.S. PATENT DOCUMENTS

| | | | |
|---|---|---|---|
| 6,185,598 B1 * | 2/2001 | Farber et al. ................. | 709/200 |
| 6,385,693 B1 | 5/2002 | Gerszberg et al. | |
| 6,490,705 B1 | 12/2002 | Boyce | |
| 6,651,103 B1 | 11/2003 | Markowitz et al. | |
| 6,708,213 B1 | 3/2004 | Bommaiah et al. | |
| 6,757,796 B1 | 6/2004 | Hofmann | |
| 6,792,449 B2 | 9/2004 | Colville et al. | |
| 6,801,964 B1 | 10/2004 | Mahdavi | |
| 6,978,306 B2 | 12/2005 | Miller et al. | |
| 7,895,311 B1 * | 2/2011 | Juenger ......................... | 709/223 |
| 7,991,883 B1 * | 8/2011 | Streeter et al. ................ | 709/223 |
| 2001/0044851 A1 * | 11/2001 | Rothman et al. ............. | 709/231 |
| 2002/0049977 A1 * | 4/2002 | Miller et al. ..................... | 725/82 |
| 2002/0138640 A1 * | 9/2002 | Raz et al. ...................... | 709/231 |
| 2003/0174648 A1 * | 9/2003 | Wang et al. .................... | 370/235 |
| 2006/0156343 A1 * | 7/2006 | Jordan ........................... | 725/132 |
| 2006/0190609 A1 * | 8/2006 | Chetuparambil et al. ..... | 709/228 |
| 2008/0065724 A1 * | 3/2008 | Seed et al. ..................... | 709/203 |
| 2008/0222291 A1 * | 9/2008 | Weller et al. .................. | 709/226 |
| 2009/0089852 A1 * | 4/2009 | Randolph et al. ............. | 725/131 |
| 2009/0307332 A1 * | 12/2009 | Litwin .......................... | 709/219 |
| 2010/0191858 A1 * | 7/2010 | Thomas et al. ............... | 709/231 |
| 2010/0228862 A1 * | 9/2010 | Myers ........................... | 709/227 |

\* cited by examiner

*Primary Examiner* — Philip B Tran
(74) *Attorney, Agent, or Firm* — Steven L. Nichols; Van Cott, Bagley, Cornwall & McCarthy P.C.

(57) ABSTRACT

Providing media content includes receiving a request from a client for a portion of a selected media file in a streaming server at a streaming tier in a multi-tiered architecture for media content storage and streaming; streaming the requested portion of the selected media file to the client directly from the streaming server if the selected media file is stored on the streaming server; and streaming the requested portion of the selected media file to the client from the streaming server by reverse proxy to at least one server of a storage tier in the multi-tiered architecture if the media file is not stored on the streaming server.

18 Claims, 15 Drawing Sheets

EFFICIENT STREAMING SERVER

CROSS-REFERENCE TO RELATED PATENT APPLICATIONS

The present application claims priority under 35 U.S.C. §119(e) to U.S. Provisional Patent Application Ser. No. 61/299,459, which was filed on Jan. 29, 2010.

TECHNICAL FIELD

The present disclosure relates generally to computers and computer-related technology. More specifically, the present disclosure relates to an efficient streaming server in a multi-tiered streaming architecture.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. These computers are often interconnected to form a computer network. One or more servers may provide data and services for other client computers on a network. The client computers are often referred to as clients. A computer network may include hundreds or even thousands of clients.

Many content distribution networks (CDNs) provide media content (e.g. audio, video) streaming services to end users. Content providers desire their media content to be available to end users with minimal start-up and buffering delays and with a good overall quality of service. However, many prior art CDN systems do not provide the quality of service that users desire. For instance, users of some types of CDNs, due to limitations in bandwidth and implementation problems, experience unreliable streaming and low-quality media.

DETAILED DESCRIPTION

Figure 1:
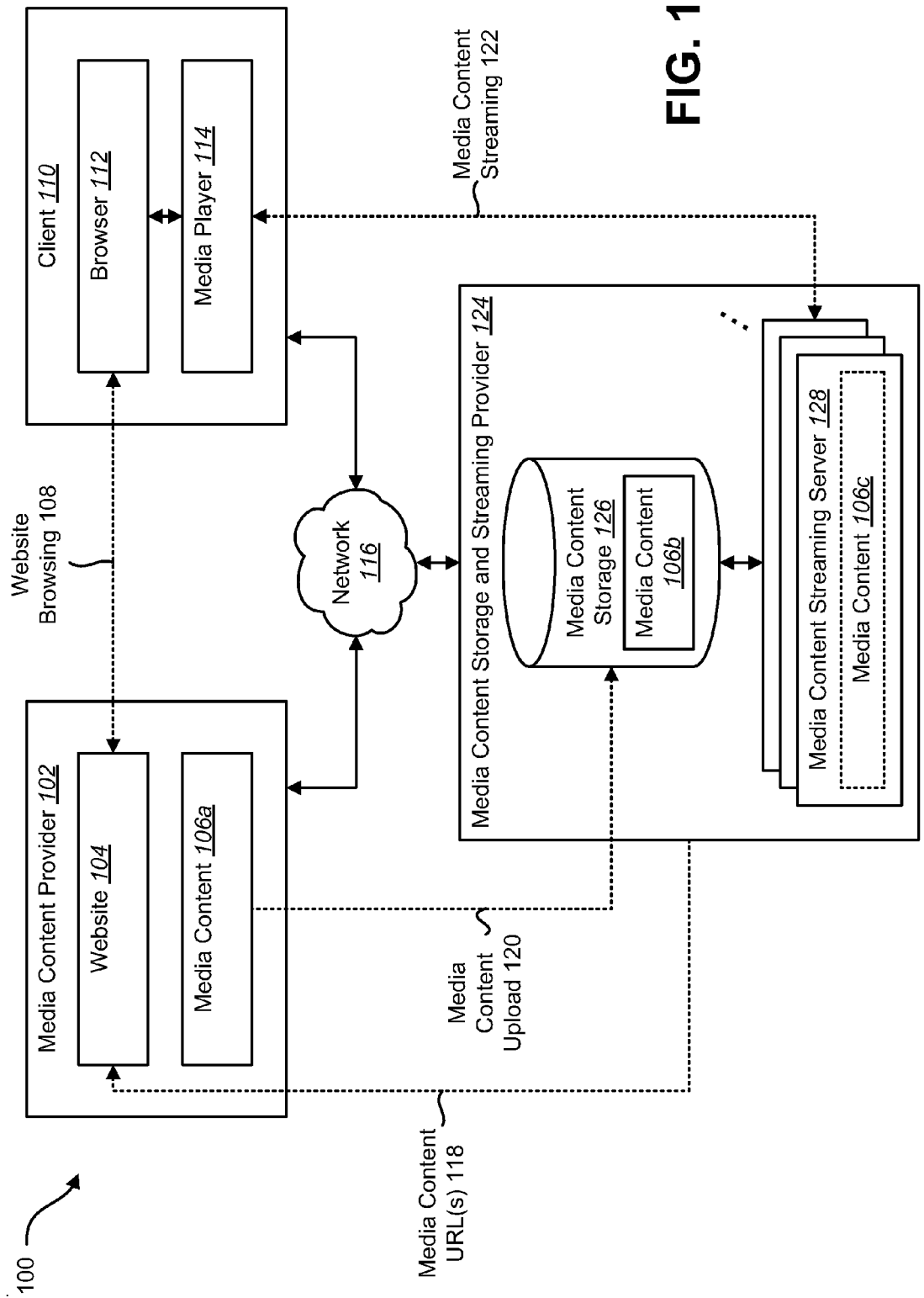
FIG. 1 is a block diagram illustrating a network of connected devices including a media content storage and streaming provider according to one exemplary embodiment of the principles described herein.

Content distribution networks may commonly be used to provide video streaming services to end users. A content distribution network may be a group of computer systems working to cooperatively deliver content quickly and efficiently to end users over a network. End users may be able to access a wide variety of content provided by various content producers. To compete for viewing time, content producers desire their media content to be available to end users through high-quality video and audio with minimal delays and stalling. Accomplishing this goal may require collaboration from a variety of networking equipment and storage systems. Such equipment and systems may only be capable of providing a limited bandwidth to end users. As a result, media content may often be compressed using a variety of algorithms to reduce the amount of data required for streaming. However, media content may only be compressed to a certain extent. Thus, it may be desirable to develop efficient structures and collaboration mechanisms which will provide media content to end users at a rate required to maintain quality of service and experience for streaming. Providing more media content data at an optimal rate may allow smooth and high-quality media content streaming, thereby enhancing user viewing experience.

The present specification relates to a data storage structure which may provide mechanisms for increasing the efficiency at which media content may be streamed to end users. According to one configuration, a data storage structure may include an archive tier, at least one storage tier, and a streaming tier. All media content available for streaming may be stored in the archive tier. That media content may also be distributed across multiple storage clusters making up the storage tier. The streaming servers may replicate locally at least some of the media content stored on multiple storage clusters. The streaming servers may then stream requested media content to client systems by sending the requested media content directly from local storage to the client systems and by acting as a reverse proxy to the storage clusters to stream media content stored by the storage clusters to the client systems. Through use of a data storage structure using principles described herein, media content streaming may be provided to end users at an optimal rate and with more reliability.

Previous content delivery architectures may have potential performance bottlenecks that could affect scalability and performance delivery. By contrast, the architecture for content delivery disclosed in the present specification may alleviate this performance and throughput bottleneck and may be capable of scaling up to support a large number of content streams from a point of presence (POP). A multi-tier media storage architecture with content distributed across a streaming tier and a storage tier is disclosed. Content may be dynamically moved and synchronized to the streaming tier servers based on access frequency and media content profile.

Thus, a data storage structure for a content distribution network may be configured so as to provide horizontal scalability and increased system performance and throughput. This may be accomplished using a tiered data storage structure. The data storage structure may include an archive tier configured to store media content, a storage tier connected to archive tier, and a streaming server tier connected to the storage tier. The streaming server tier may be configured to stream media content to client systems.

Various configurations of the system are now described with reference to the Figures, where like reference numbers indicate identical or functionally similar elements. The systems and methods, as generally described and illustrated in the Figures herein, could be arranged and designed in a wide variety of different configurations. Thus, the following more detailed description of several configurations of the system, as represented in the Figures, is not intended to limit the scope of the invention, as claimed, but is merely representative of various system configurations.

Many features of the system configurations disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device. Software that implements the functionality associated with components described herein may comprise a single instruction, or many instructions, and may be distributed over several different code segments, among different programs, and across several memory devices.

FIG. 1 is a block diagram illustrating a network of connected devices 100 including a media content storage and streaming provider 124. A media content provider 102, a media content storage and streaming provider 124 and a client 110 may be connected via a network 116 (e.g. an intranet, or the Internet). The media content provider 102 may include a website 104 and media content 106a. The media content storage and streaming provider 124 may include media content storage 126 and one or more media content streaming servers 128. The media content provider 102 may upload 120 the media content 106a to the media content storage and streaming provider 124. The media content storage and streaming provider 124 may store the media content 106b in the media content storage 126. The media content storage and streaming provider 124 may send one or more media content Uniform Resource Locators (URLs) 118 to the media content provider 102. The media content provider 102 may make the one or more media content URLs 118 available for its website 104. The media content storage and streaming provider 124 may copy or cache the media content 106c on the one or more media content streaming servers 128.

The client 110 may be a computing device. Examples of computing devices include, but are not limited to, a desktop computer, laptop computer, cell phone, smart phone, tablet, netbook, e-book (i.e. e-reader), personal digital assistant (PDA), game console, television, personal media player, and the like. The client 110 may include a browser 112 and a media player 114. The media player 114 is an application used to play media files (e.g. audio or video files). The media player 114 may be separate from the browser 112, or may be incorporated within the browser 112. The client 110 uses the browser 112 to browse 108 the website 104. The client 110 may select one or more media content URLs 118 on the website 104. The media player 114 may use the one or more URLs 118 to access one or more media content streaming servers 128. The one or more media content streaming servers 128 stream 122 the media content 106b, 106c associated with the one or more URLs, to the client 110. The media player 114 plays the streamed 122 media content 106b, 106c on the client 110.

As shown in FIG. 1, one possible use case for this system is when a provider of content wishes to provide this content to end users on the Internet, but further desires to have the hosting and streaming of the content provided by a service provider that specializes in the storage and streaming of media content, such as the media content storage and streaming provider 124. The media content provider 102 provides the content to the storage and streaming provider 124, which in turn typically provides URLs 118 to the media content provider 102 so that the content provider 102 can place the URLs onto its website 104. Users browsing 108 the website 104 may click on a thumbnail, for example, of a video that links to the URL 118 provided by the storage and streaming provider 124. The client browser 112 or media player 114 may then access the video from the storage and streaming provider 124 using the URL 118. This use case provides only one possible configuration. Many other configurations and use scenarios are possible using the systems and methods described herein.

Figure 2:
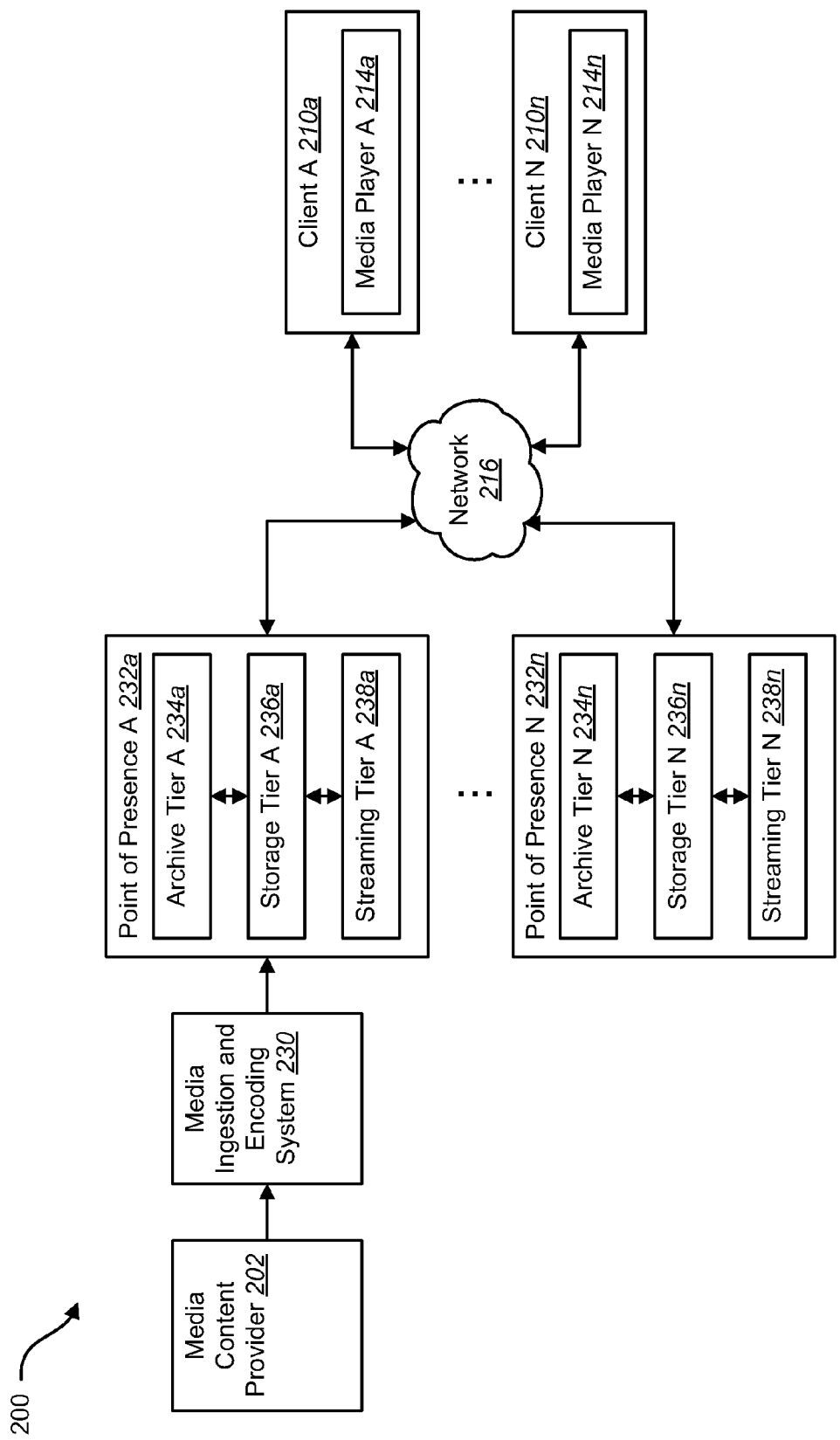
FIG. 2 is a block diagram illustrating a multi-tiered storage architecture for storing and streaming media content according to one exemplary embodiment of the principles described herein.

FIG. 2 is a block diagram illustrating a multi-tiered storage architecture 200 for storing and streaming content. A media content provider 202 may be connected to a media ingestion and encoding system 230, which in turn may be connected to point of presence A (POP) 232a. A number of POPs 232a-n may be connected to each other and to one or more clients 210a-n via a network 216 (e.g. an intranet or the Internet). The media content provider 202 provides media content. For example, the media content provider 202 may provide media content (e.g. audio, video) for streaming such that an end user of one of the clients 210a-n may consume (e.g. listen to, view) the media content. The media ingestion and encoding system 230 may receive media content from the media content provider 202. The encoding system 230 may encode the media content into a particular format and/or send it to a POP A 232a for storage and/or streaming.

The POPs 232a-n are systems where media content is stored and/or streamed to client computing devices 210a-n through the network 216. The POPs 232a-n may include archive tiers 234a-n, storage tiers 236a-n, and streaming tiers 238a-n. The archive tiers 234a-n have at least one storage device, such as a disk. For example, the archive tiers 234a-n may comprise one or more "just a bunch of disks" (JBODs) for storing media content. That is, the archive tier may comprise modules ("bricks") assembled in a cluster arrangement where the modules include disks for storing digital content. These modules may be placed on a rack. The storage tiers 236a-n include storage servers for storing media content. The streaming tiers 238a-n include streaming servers. The POP A 232a may receive encoded and/or formatted media content from the media ingestion and encoding system 230. The POP A 232a stores the encoded media content in the media archive tier A 234a and the storage tier A 236a. The POP 232a may also store or cache the media content on the streaming tier 238a. The media content may also be distributed via the network 216 to additional POPs 232n from the POP A 232a. For example, the POP N 232n may receive the encoded media data and store it on its corresponding archive tier N 234n, storage tier N 236n, and/or store (or cache) it on the streaming tier N 238n.

The media streaming tiers 238a-n may stream the media content to one or more clients 210a-n via the network 216 (e.g. intranet, the Internet). For example, POP A 232a may stream media content to client A 210a, while POP N 232n may stream media content to client N 210n. Additionally, a single client A 210a may concurrently stream media content from one or more POPs 232a-n. The clients 210a-n include media players 214a-n which play media content streamed from the POPs 232a-n.

Figure 3:
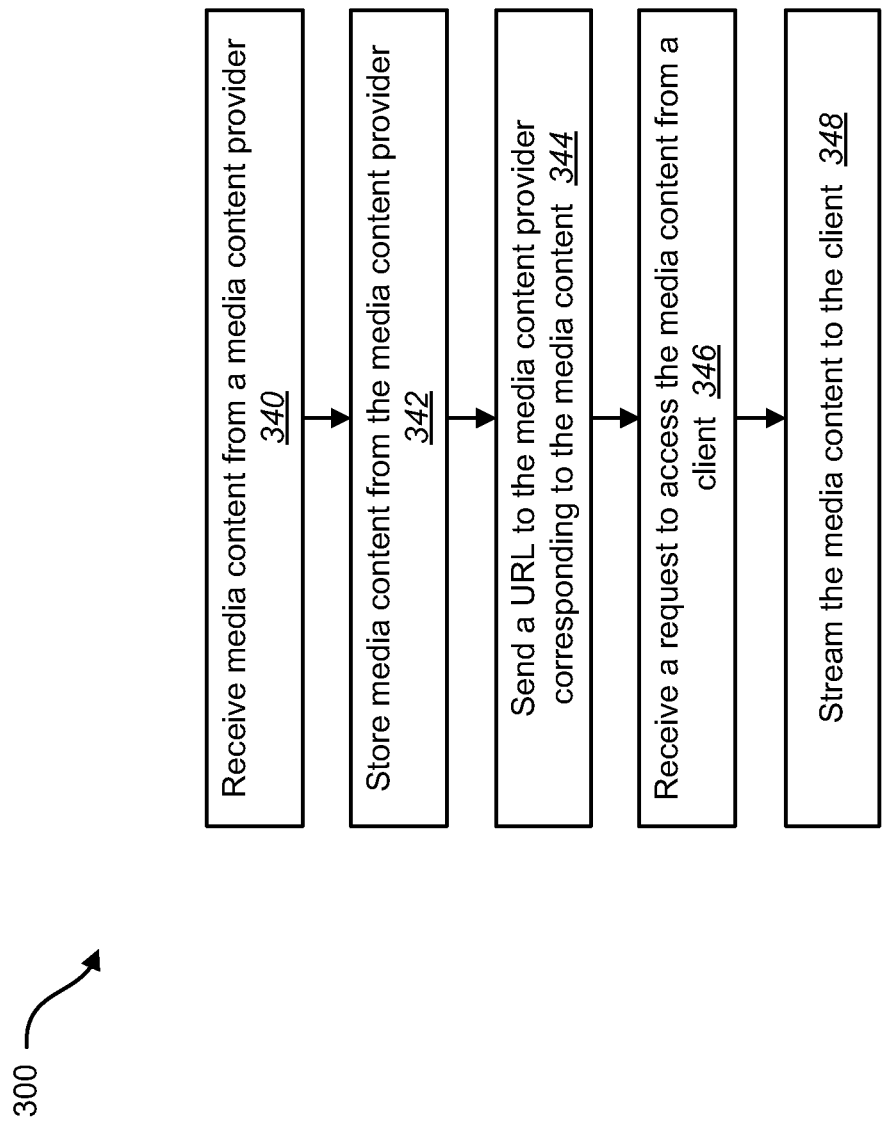
FIG. 3 is a flow diagram illustrating a method for storing and streaming media content according to one exemplary embodiment of the principles described herein.

FIG. 3 is a flow diagram illustrating a method 300 for storing and streaming media content. A media content storage and streaming provider 124 may receive 340 media content from a media content provider 102. For example, a media content provider 102 uploads media content in the form of media files to the media content storage and streaming provider 124. The storage and streaming provider 124 stores 342 the media content. For example, the media content may be stored on one or more storage servers, in an archive, and/or optionally on one or more streaming servers. Specifically, the media content storage and streaming provider 124 may assign a "home" storage location (e.g. cluster) for the media content on a storage tier 236 so that the media content is immutably guaranteed to be available at the "home" storage location.

The media content storage and streaming provider 124 may send 344 a URL to the media content provider 102 corresponding to the media content. For example, a URL that includes the address of the media content on the streaming and/or storage tiers 238, 236 may be sent to media content providers 102 for placement on their websites 104. The storage and streaming provider 124 may receive 346 a request to access the media content from a client 110. For example, it 124 may receive 346 a hyper text transfer protocol (HTTP) GET request from a client 110 at a URL corresponding to the media content address for a specific portion of the media content. For example, a client 110 might request a specific set of 100 bytes of a media content file located at a specified URL. In certain embodiments, the requested set of 100 bytes may be one portion ("chunk") out of many portions requested by the client, where the client is able to intelligently and dynamically vary the size of portions requested. The URL may be directly translated into the media content address without lookup. The media content storage and streaming provider 124 may stream 348 the media content to the client 110 that requested the media content. For example, one or more streaming servers on a streaming tier 238a may stream 348 the requested media content. Additionally, media content may be streamed from multiple POPs 232a-n.

Figure 4:
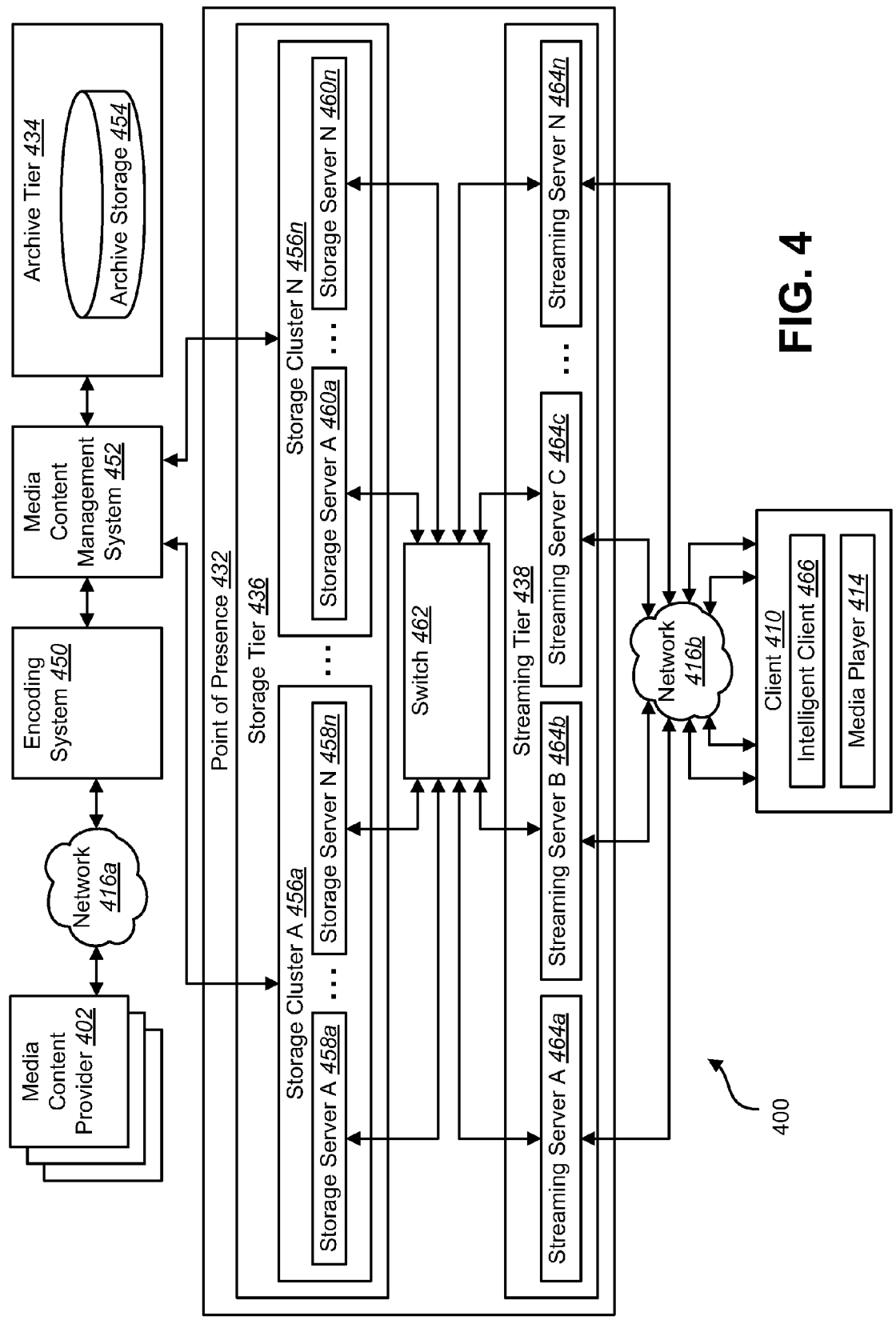
FIG. 4 is a block diagram illustrating a multi-tiered architecture for storing and streaming media content according to one exemplary embodiment of the principles described herein.

FIG. 4 is a block diagram illustrating a multi-tiered architecture 400 for storing and streaming media content. An encoding system 450 may be connected to a media content management system 452. The multi-tiered architecture 400 (i.e. the "storage structure") may include an archive tier 434, a storage tier 436 and a streaming tier 438. The storage tier 436 and streaming tier 438 may be located within a POP 432. One or more media content providers 402 may send or upload media content to the storage structure for streaming media 400 via a network 416a (e.g. an intranet or the Internet). The encoding system 450 may transcode the content for streaming formats used by the storage structure for streaming media 400. Examples of different formats include, but are not limited to, MPEG (Moving Pictures Expert Group, including MP3, MP4, etc.), 3GPP (Third Generation Partnership Project), JTV (a proprietary format developed by Vusion), JTA (a proprietary format developed by Vusion), QuickTime® and .mov (proprietary formats developed by Apple), Windows Media® (a proprietary format developed by Microsoft), Flash® (a proprietary format developed by Adobe), and any other format that may suit a particular application of the principles described herein. In certain embodiments, the 3GPP format or any other applicable format may be used to stream media to a mobile device through a 3G or other applicable cellular system. Additionally or alternatively, other formats may be more suitable for a personal computer embodiment.

The encoding system 450 may also replicate and format the media content for viewing at different resolutions and/or bit rates. For example, the media content formats may include a 720p format, a 480p format, and a 1080p format. The media content management system 452 may assign addresses to different pieces of media content for storage on the storage structure 400 for streaming media content. In one possible configuration, a separate directory folder is created and named for each media content provider 402. The media content management system 452 may also create and name separate directory folders within the media content provider 402 folders for each piece of media content. A piece of media content may be a video, a music track, a picture, etc. Media content "assets" corresponding to each piece of media content may be stored in the media content directory folders. These "assets" may be files corresponding to the piece of media content. For example, the media content "assets" of a video may include different video file formats, bit rates, resolutions, corresponding audio files (e.g. of differing bit rates, languages, etc.), subtitle files (e.g. of different languages, etc.). The media content may be stored on both the storage tier 436 and the archive tier 434. The storage structure for streaming media 400 includes one or more storage clusters 456a-n on the storage tier 436. Each of the storage clusters 456a-n includes one or more storage servers 458a-n, 460a-n. The media content management system 452 may assign one of the storage clusters 456a-n, 460a-n as a "home" storage cluster. For example, a "home" storage cluster A 456a is where a piece of media content is stored with a guaranteed location. Unless it is deleted from the system, a piece of media content will always be available on its "home" storage cluster A 456a (i.e., its storage address will remain the same). Although a piece of media content has a "home" storage cluster, it may also be distributed amongst additional storage clusters 456a-n. The media content may also be cached on one or more streaming servers 464a-n. The distribution of the media content may depend or be based on client 410 demand for the media content. Each piece of media content available on the storage structure for streaming media 400 is also stored in the archive storage 454 on the archive tier 434. Accessing the media content stored on the archive tier 434 generally has greater latency than accessing it on the storage tier 436. Storing the media content on the storage tier 436 in addition to the archive tier 434 may thus allow the streaming tier 438 to access stored media content with less latency. This may enable the streaming tier 438 to deliver the media content to the client 410 more rapidly. Furthermore, the 3-tiered architecture offers improved scalability over earlier architectures.

The storage structure 400 for streaming media content may include a switch 462 between the storage tier 436 and the streaming tier 438. The switch 462 connects the storage servers 458a-n, 460a-n to streaming servers 464a-n located on the streaming tier 438. The switch 462 facilitates the transfer of media content from the storage tier 436 to the streaming tier 438. The streaming servers 464a-n may stream media content to a client 410 via a network 416b (e.g. intranet, the Internet). The client 410 may include an intelligent client 466 and a media player 414. The intelligent client 466 is a hardware and/or software module that requests multiple portions of media content from one or more of the streaming servers 464a-n. For example, the intelligent client 466 may be configured to request multiple portions of a media content file, where the different portions have variable sizes. The intelligent client 466 may have embedded addresses (e.g. URLs, IP addresses) that indicate an address (e.g. a "base" address) for accessing the POP 432, the streaming tier 438 and/or storage tier 436. These embedded addresses may be configured when installing the intelligent client 466 on a host device (e.g., as a file named servers.dat). Additionally, in certain embodiments, the embedded addresses may be updated dynamically and transmitted to all intelligent clients 466 in the network when and if an additional server or cluster is added to the storage structure 400. Thus, the intelligent client 466 may access a POP using an embedded address such that a Domain Name Service (DNS) lookup may not be necessary. The media player 414 plays streamed media content and is designed to read certain media content formats. The media player 414 may be part of the intelligent client 466. The client 410 may request and receive media content from multiple streaming servers 464a-n or multiple POPs in order to sustain a sufficient bit rate and throughput such that the media content may be displayed with a good quality of service.

Media content that is being currently streamed (e.g. a working set) may be moved to the streaming servers 464a-n on the streaming tier 438. This task may be performed by a content synchronization daemon ("syncd"). The working set may be moved or copied to the streaming tier local disk based on replication rules, which may be customizable for each media content originator. However, in the majority of embodiments media content will be copied to and remain on the streaming tier based on the popularity of the content. The storage structure 400 makes a "best effort" (i.e. best effort delivery) to move working set files onto streaming servers 464a-n. The ability to move the working set to the streaming tier 438 may be limited by the local disk capacity available on streaming tier 438. Thus, when a streaming server runs out of disk space, least recently used (LRU) files may be deleted from the streaming server to make space while allowing more popular most recently used (MRU) files to remain on the streaming server. A copy of all media content ingested into the POP 432 is stored in the archive storage 454 in the archive tier 434. Some media content may be distributed on the storage clusters 456a-n based on replication rules specified by a media content provider (e.g. customer).

The architecture illustrated in FIG. 4 may alleviate bottlenecks between the storage tier 436 (i.e. storage servers 458a-n, 460a-n) and the streaming tier 438 (i.e. streaming servers 464a-n). More specifically, the storage structure for streaming media 400 may include the storage in the storage clusters 456a-n and also the local disk cache on the streaming servers 464a-n. Certain storage structure 400 components are responsible for content ingestion and replication across other POPs 232a-n and for moving and synchronizing content between the disk clusters 456a-n and the streaming server 464a-n caches.

The storage structure for streaming media content 400 may thus provide a scalable and high performance storage system. Specifically, it is designed as a single logical content repository implemented across multiple storage clusters 456a-n. It may also be distributed across multiple POPs 232a-n. While the storage structure 400 may include many storage clusters 456a-n, the content naming scheme that may be managed by the media content management system 452 along with storage structure 400 may allow storage to be viewed as a single large data store. The storage structure may thus be easily scaled up by adding new disk clusters.

Additionally, the storage structure 400 may be configured to be a multi-tenant repository partitioned across multiple media content provider (e.g. customer) 402 accounts. Specifically, when content from multiple media content providers 402 is ingested into the present system, content for each customer is kept separate from each other. Storage quotas may be applied on a per tenant basis.

Figure 5:
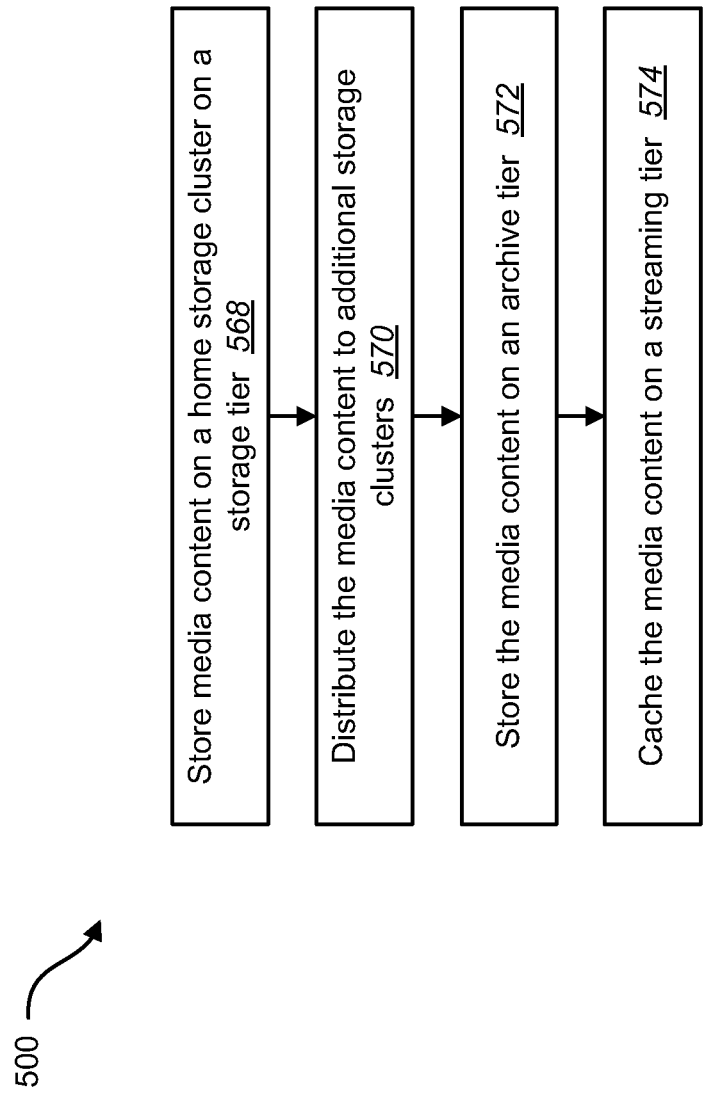
FIG. 5 is a flow diagram illustrating a method for storing media content for streaming according to one exemplary embodiment of the principles described herein.

FIG. 5 is a flow diagram illustrating a method 500 for storing media content for streaming. A storage structure 400 may store 568 media content on a "home" storage cluster on a storage tier 436. Media content is received and stored 568 on an assigned "home" storage cluster A 456a. The storage structure 400 may further distribute 570 the media content to additional storage clusters. That is, the media content may be replicated on additional storage servers 460a-n. The storage structure 400 may also store 572 the media content on an archive tier 434. For example, the media content may be replicated from its "home" storage cluster A 456a to the archive storage 454 on an archive tier 434. Optionally, the storage structure 400 may cache 574 the media content on one or more streaming servers 464a-n on a streaming tier 438.

Figure 6:
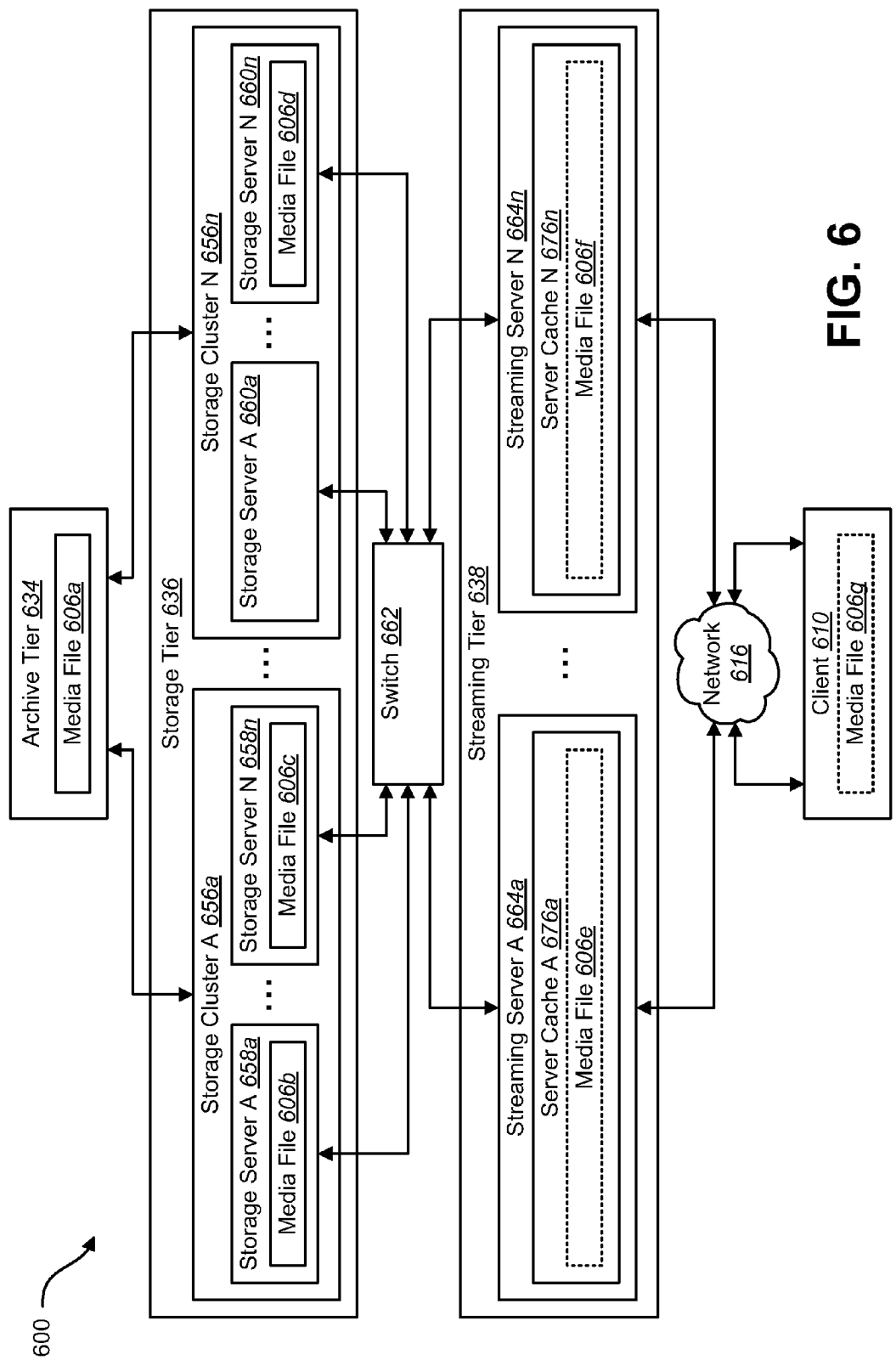
FIG. 6 is a block diagram illustrating the distribution of a media file in a storage structure for streaming media content according to one exemplary embodiment of the principles described herein.

FIG. 6 is a block diagram illustrating the distribution of a media file in a storage structure 600 or system 600 for streaming media content. A storage tier 636 may include one or more storage clusters 656a-n. The storage clusters 656a-n include storage servers 658a-n, 660a-n. A media file 606 may be ingested into the storage structure 600 and assigned a "home" storage cluster (e.g. storage cluster A 656a) on the storage tier 636. The media file 606b-c is guaranteed to be available on its "home" storage cluster A 656a. If the media file 606 is not available on a streaming server 664a-n, for instance, it may be accessed on its "home" storage cluster A 656a. A "home" storage cluster identification (ID) or address may be part of a content name or Uniform Resource Locator (URL) such that the location of a "home" storage cluster may be efficiently determined by the system without any further lookup. The media file 606 may also be distributed to additional storage servers located in other storage clusters. One example is where the media file 606 is replicated on storage server N 660*n* on storage cluster N 656*n*. The degree to which a media content file 606 is replicated may depend at least in part on its anticipated or expected popularity or its actual popularity. All media files stored in the storage structure 600, including the media file 606*a*, may also be copied on an archive tier 634.

The "home" storage cluster of a media file 606 may be assigned based on rules set up in the media content management system 452 (e.g. a Video Management System (VMS)) when a media content provider 402 account is created. All of the media content for a single media content provider 402 may have a home on the same cluster. Once content has been ingested into the storage structure 600, its "home" storage cluster may not be altered as this could result in invalid media URLs that are distributed out in the Internet on media content provider 102 websites 104. Even though the "home" cluster storage cluster may not be altered, the physical location of the cluster itself may be moved anywhere within the "media store" (e.g. across POPs 432).

The storage servers 658*a-n*, 660*a-n* may be connected to streaming servers 664*a-n* on a streaming tier 638 via a switch 662. The streaming servers 664*a-n* include server caches 676*a-n*. The server caches 676*a-n* may comprise large amounts of Random Access Memory. The server caches 676*a-n* may also comprise local hard disk space. Frequently accessed data that may be more costly (e.g. time consuming) to retrieve from its original storage location is stored in the server caches 676*a-n*. The server caches 676*a-n* may thus allow faster access to the media file 606. The media file 606*b-d* located on the storage tier 636 can be distributed to one or more server caches 676*a-n*. For example, the media file 606 may be distributed such that the media file 606*e-f* is cached in the server caches 676*a-n*. The client 610 requests the media file 606 via a network 616 (e.g. an intranet or the Internet). The media file 606 is streamed from one or more streaming servers 664*a-n*. If the media file 606 is not located within the server caches 676*a-n*, then the media file 606*b-d* may be sent to the client 610 from one or more storage servers 658*a-n*, 660*n* via one or more streaming servers 664*a-n*. The storage structure 600 may cache the media file 606 on the streaming tier 638 (i.e. in one or more server caches 676*a-n*) in the process of fulfilling the request. The client 610 may display the media file 606*g*.

At a logical level the storage structure 600 may be viewed as single large repository. However, at a physical level the storage structure 600 may comprise multiple storage clusters 656*a-n*. At a physical level, storage may also be distributed over multiple POPs 232*a-n*. In order to maintain streaming performance, content may be available on a cluster at a POP 232*a-n* from where it is being streamed. Furthermore, if a system component needs to fetch specific media content that is not available in a local cache and storage cluster, it may fetch the file from its home storage cluster on another POP 232*a-n*.

In certain embodiments, a media file 606 received from a media content provider may be flagged as "hot" when the media file 606 is first uploaded to the storage structure 600. This "hot" flag may indicate to the storage structure 600 that the media file 606 has already been selected for storage and caching in the streaming tier 638. Thus, for example, a media file 606 that is anticipated to incur a large amount of demand, such as a new episode of a popular series, may be flagged as "hot" such that adequate resources are allocated to the media file 606 in anticipation of a large number of requests for that media file 606 from different clients 610. Additionally or alternatively, a media file 606 producer or originator may have the option to flag a media file 606 as "hot" in exchange for a higher hosting fee, even if it is not immediately anticipated that the media file 606 will incur a large amount of demand. This arrangement may be desirable to the producer or originator of the media file 606 due to the fact that the faster processors and network connections of the streaming servers 664 in the streaming tier 638 may provide a better viewing experience to a user than streaming the media file 606 from only the storage tier 636, particularly where the media file 606 is large or in high-definition.

Figure 7:
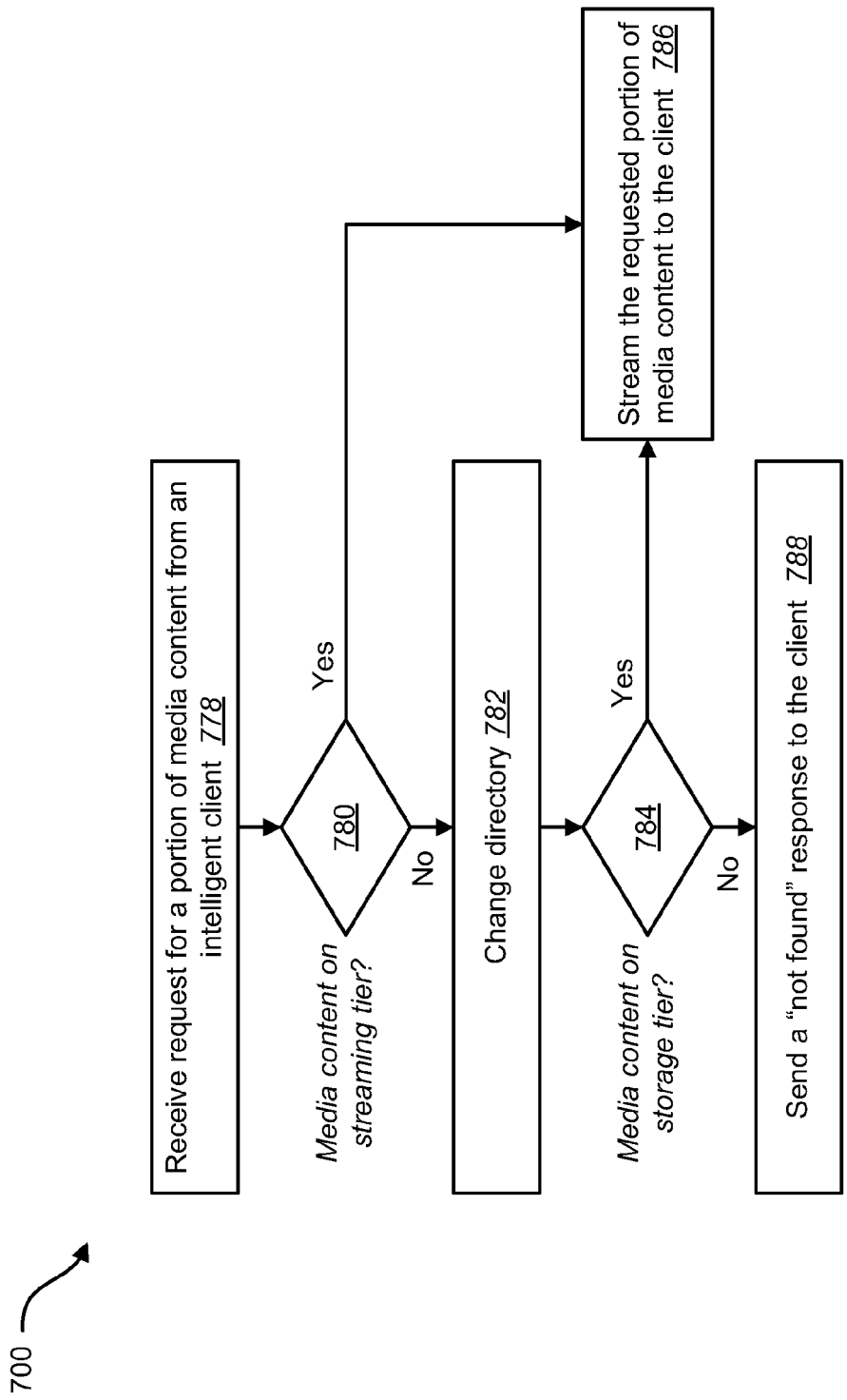
FIG. 7 is a flow diagram illustrating a method for streaming media stored on a multi-tiered storage structure according to one exemplary embodiment of the principles described herein.

FIG. 7 is a flow diagram illustrating one possible configuration of a method 700 for streaming media stored on a multi-tiered storage structure. A media content storage and streaming provider 124 may receive 778 a request for a portion of media content from an intelligent client. More specifically, the media content storage and streaming provider 124 receives 778 a request for a specified number of bytes (e.g. a range of bytes in a media file 606) at a specified address on the storage structure 600. In certain embodiments, the number of bytes specified may vary with each request. Additionally or alternatively, one or more of the requests may specify the same number of bytes, but from different portions of the media file 606. For example, an intelligent client 466 sends an HTTP GET request to one or more streaming servers 664*a-n* at a particular URL. The URL contains an address that points to the location of a media file 606 on the storage structure 600. The URL is translated and appended to a directory that points to content on the streaming tier 638. That is, the directory may be generic to the server caches 676*a-n* on the streaming servers 664*a-n*.

The media content storage and streaming provider 124 may determine 780 whether the requested media content is currently cached or stored on the streaming tier 638. If the media content is currently cached or stored on the streaming tier 638, the media content storage and streaming provider 124 may stream 786 the requested portion to the client 610. In other words, the media content storage and streaming provider 124 may stream 786 the content to the client 610 via one or more streaming servers 664*a-n*. If the media content is not currently cached or stored on the streaming tier 638, the media content storage and streaming provider 124 may change 782 the directory. For example, the media content storage and streaming provider 124 may change the directory that points to the streaming tier 638 to a directory that points to content on the storage tier 636.

The media content storage and streaming provider 124 may determine 784 whether the requested media content is stored on the storage tier. If the media content is stored on the storage tier 636, the media content storage and streaming provider 124 may stream 786 the requested portion of the media content to the client 610. If the media content is not stored on the storage tier 636, the media content storage and streaming provider 124 may send 788 a response to the client indicating that the requested media file was not found. For example, the media content storage and streaming provider 124 may send an HTTP 404 (e.g. "not found") response to the client 610.

Figure 8:
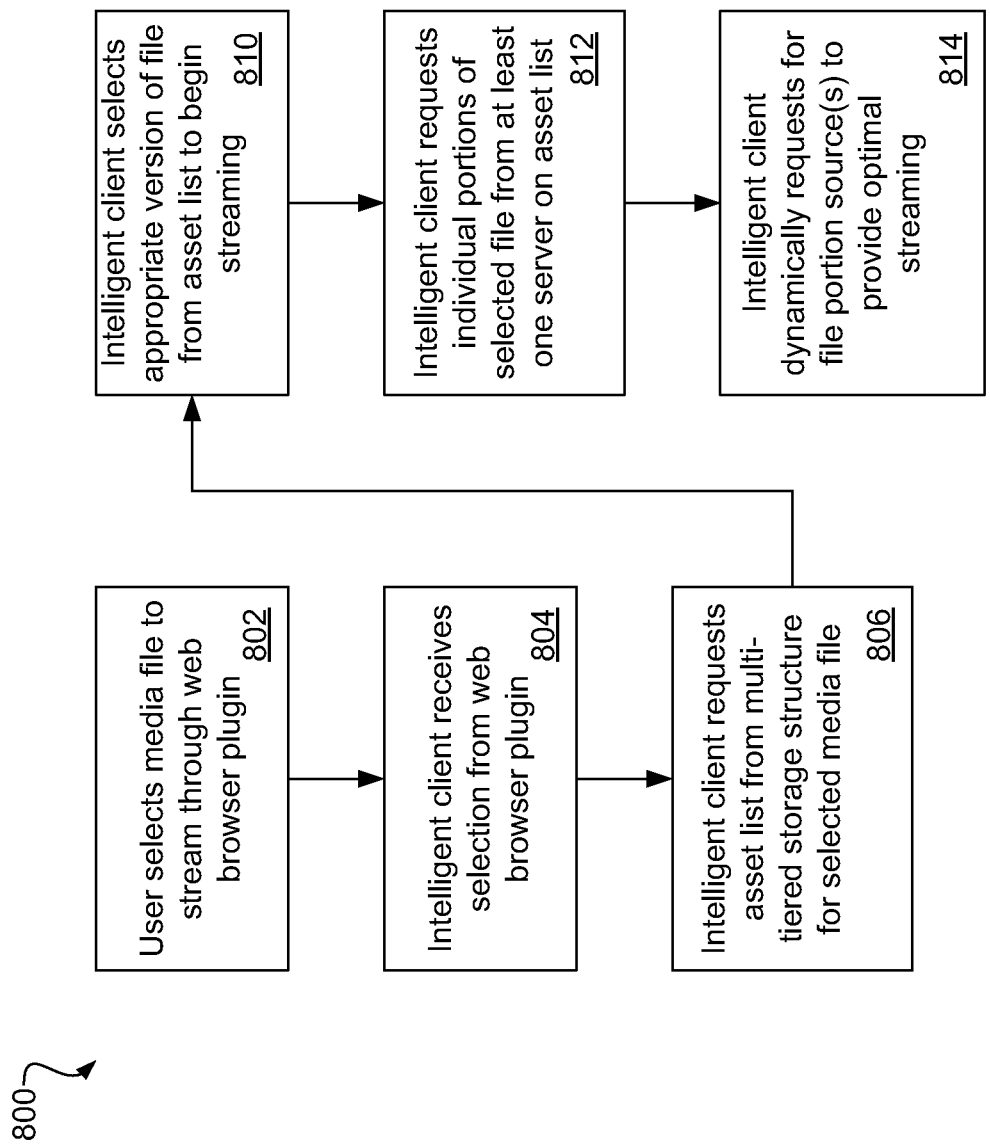
FIG. 8 is a block diagram of an illustrative method of streaming a media file to an intelligent client according to one exemplary embodiment of the principles described herein.

FIG. 8 is a flow diagram illustrating another possible configuration of a method 800 for streaming media stored on a multi-tiered storage structure 600 using an intelligent client 610. In this method 800, a user selects 802 a media file to stream through a web browser plugin. An intelligent client 610 in the user's computer receives 804 the selection from the browser plugin and requests 806 an asset list from the multi-tiered storage structure 600 corresponding to that particular media file. The asset list includes information about which versions of the selected media file are stored the multi-tiered storage structure 600.

For example, a user may select a video for streaming. The multi-tiered storage structure 600 may store one or more JTV files for the visual portion of the video and a JTA file for the audio portion of the video. Additionally, the multi-tiered storage structure 600 may store different versions of the same video as one or more MP4 files in addition to a GIF thumbnail file. One exemplary embodiment of this type of asset list is given as follows (written in Java Script Object Notation (JSON) format):

```
{"domains":[ ],"assets":
{"video":[{"name":"M1010exvBjdxCqEFkjFmeGyrqGqFFpkJ.jtv",
"format":"jtv","bitrate":425,"framerate":24,"width":576,"height":324,
"default":true},
{"name":"M1010rxvBjdxhqEFkjFmeknjxquyrCBB.mp4","format":"mp4",
"bitrate":994,"framerate":24,"width":640,"height":360,"default":true},
{"name":"M1010ixvBjdxEqEFkjFmemzGmrzGDwpH.mp4","format":
"mp4","bitrate":1359,"framerate":24,"width":640,"height":360}],
{"name":"M1010oxvBjdxeqEFkjFmeFneynymqEmw.jtv","format":
"jtv","bitrate":631,"framerate":24,"width":640,"height":360},
"image": [{"name":"M1010VxvBjdxVqEFkjFmeVFFzmelbsxy.gif",
"format":"gif","width":150,"height":150,"default":true}],
"audio":[{"name":"M1010sxvBjdxoqEFkjFmeIHxHjlgrJwm.jta","format":
"jta","bitrate":125,"language":"xx","channels":"","default":true}]}}
```

Thus, in the above example, the files stored by the multi-tiered storage structure 600 corresponding to the video may include:

1. A JTV video file with a bitrate of 425, a frame rate of 24, a width of 576 pixels, and a height of 324 pixels;
2. An H.264/MP4 file with a bitrate of 994, a frame rate of 24, a width of 640 pixels, and a height of 360 pixels;
3. An H.264/MP4 file with a bitrate of 1359, a frame rate of 24, a width of 640 pixels, and a height of 360 pixels;
4. A JTV video file with a bitrate of 631, a frame rate of 24, a width of 640 pixels, and a height of 360 pixels;
5. A GIF thumbnail image file with a width of 150 pixels and a height of 150 pixels; and
6. A JTA audio file (which can be played together with either of the above JTV video files) having a bitrate of 125, and a language of "xx."

Of course, in other embodiments, any suitable combination of media files having any suitable format, bitrate, and size may be used as desired or needed.

The intelligent client may select an appropriate file from the asset list to begin streaming from the multi-tiered storage architecture 600. In certain embodiments, this selection may be determined based on the device on which the video is to be played. For example, in the above exemplary asset file, the larger, higher definition H.264/MP4 file may be more suitable for playing on a personal computer screen or a tablet computer (e.g., Apple Ipad®), whereas a smaller, lower bitrate, or lower definition H.264/MP4 file may be more suitable for playing on a personal media device (e.g., Apple Ipod® or Iphone®). Additionally or alternatively, the selection of which file to being streaming may be made based on the speed of a network connection.

In certain embodiments, an intelligent client may give priority to file formats that can provide better quality and/or compression than other file formats. For example, the JTV format typically provides HD quality at a good compression ratio such that the bandwidth requirement to stream a JTV file is considerably lower than what would be required to obtain the same picture quality using other formats. Where a preferred format is not supported by the host system executing the intelligent client, the intelligent client may resort to other formats provided in the asset list.

Once the intelligent client has received the asset list from the multi-tiered storage structure 600, the intelligent client selects 808 an appropriate version of the media file from the asset list to begin streaming and requests individual portions of the selected version of the selected file from at least one server that stores that version of the file. For example, the intelligent client may begin by requesting different portions of a lowest resolution version of the file in a preferred format and assemble those portions such that the web browser plugin can play the video from the assembled portions of the file. The intelligent client may dynamically change to a higher bitrate stream based on network throughput response time and the video processing capabilities (e.g., CPU, video card, available RAM, etc.) of the host system executing the intelligent client.

As described above, in certain embodiments the intelligent client may dynamically vary the number of bytes requested in each portion according to the speed of the network, the server from which the portion is requested, how urgently a requested portion is needed to provide an uninterrupted viewing experience, and any other factor that may suit a particular embodiment of the principles described herein.

The intelligent client may have a built-in list of all servers or server clusters within the hierarchy of the multi-tiered storage structure 600. In certain embodiments, most or all media files will be replicated at each server in the multi-tiered storage structure 600. In such cases, the intelligent client may identify one or more servers in the multi-tiered storage structure 600 that are physically the closest in location to the intelligent client and initiate streaming with those servers to reduce the network latencies and receive the content faster. Additionally or alternatively, the intelligent client may prioritize streaming from streaming servers in the streaming tier 638 of the multi-tiered structure 600.

However, in other embodiments, it may be the case that not all of the servers in the multi-tiered structure 600 store files related to the video in all of the above formats or even at all. For instance, servers or clusters of servers in the streaming tier 638 may only store the video in the most popular format, while servers or clusters of servers in the storage tier 636 may collectively store the video in all of its supported formats. Thus, the intelligent client may be configured to first identify which servers or clusters of servers in the multi-tiered storage structure 600 store the desired file for streaming and make requests only from those servers or clusters of servers. Alternatively, the asset list received by the intelligent client may identify where all "assets," or files linked to the selected video may be found within the architecture of the multi-tiered storage structure 600, along with information about each of the different formats. In certain embodiments, the asset list will be received from the home storage cluster in the storage tier for the desired video, as the home storage cluster may store all available versions of files associated with the video.

In certain embodiments, the intelligent client may request the same portions of the same file from redundant servers in the multi-tiered storage structure 600 to ensure the fastest delivery of the portions and allow for a faster streaming experience to the user. Additionally or alternatively, the intelligent client may request analogous portions of a high-resolution version of the video and a low-resolution version of the video such that if the high-resolution portion is received in time, that portion of the video will be played in high-resolution, whereas if a high-resolution portion of the video is not received in time, a received corresponding low-resolution version portion of the video will be played in its stead.

The intelligent client may dynamically update 814 its requests for file portions as needed to provide an optimal streaming experience. For example, as described in one embodiment above, the intelligent client may dynamically switch between high- and low-resolution versions of a video file according to the speed at which the requested portions of the video are received over the network. Additionally, the intelligent client may dynamically change the servers or clusters of servers from which portions of the selected video are requested, according to a determined connection speed to each server or cluster of servers. Thus, in some examples, the intelligent client may request the same portion of the same file from different servers or clusters of servers in the multi-tiered storage structure 600 to determine which of the servers or clusters of servers in the multi-tiered storage structure 600 respond the fastest. The intelligent client may thereafter direct more requests to the servers or clusters of servers having the fastest response times.

By dynamically adjusting the number of connections between the intelligent client and servers or clusters of servers in the multi-tiered structure, the sources from which portions of the selected video are requested, and the format and resolution of the files from which portions of the selected video are requested, the intelligent client may continuously provide the best possible file streaming experience to the user, irrespective of changing network conditions.

Figure 9:
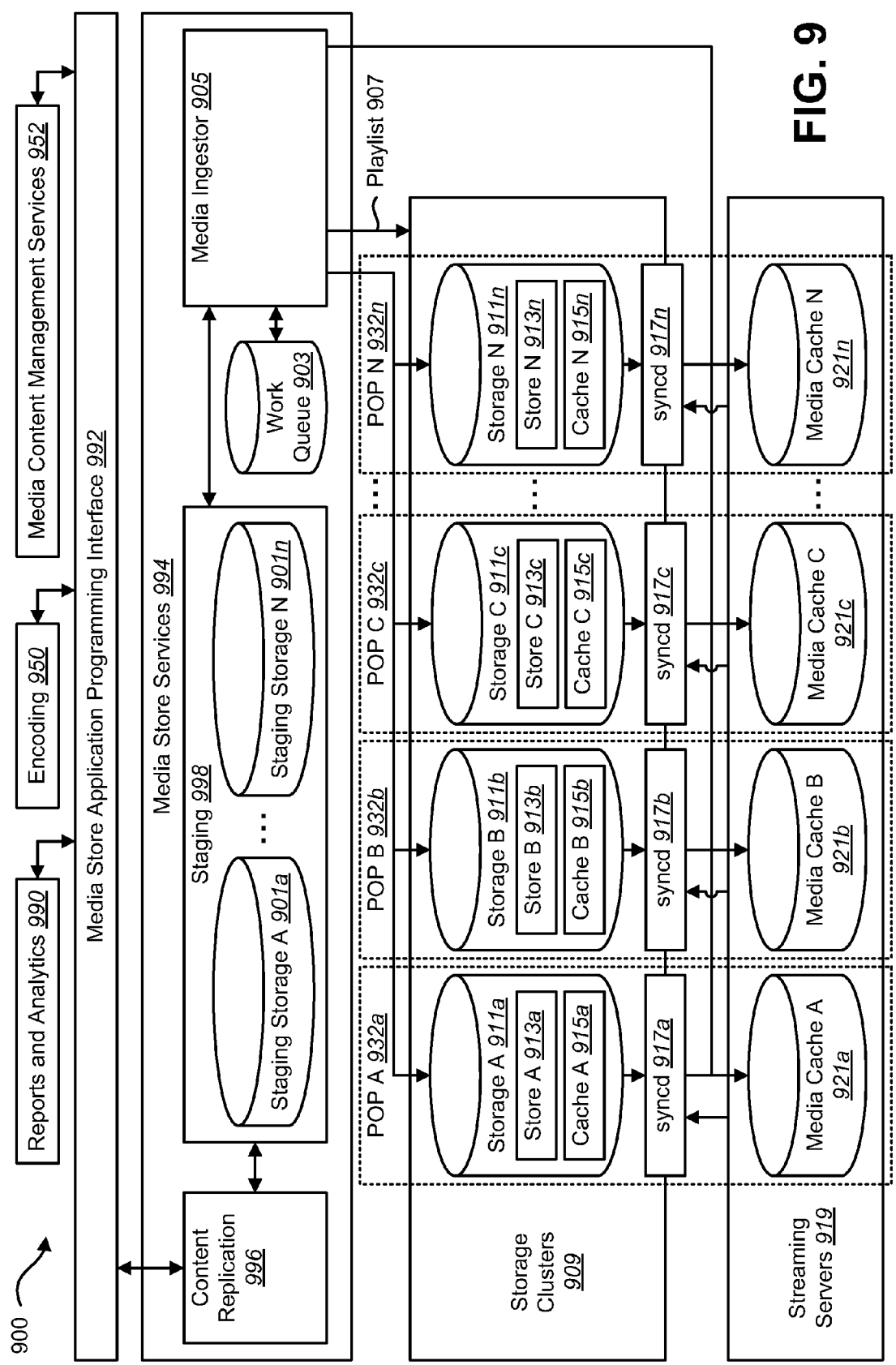
FIG. 9 is a block diagram illustrating media store services located on a media content storage and streaming provider according to one exemplary embodiment of the principles described herein.

FIG. 9 is a block diagram illustrating media store services 900 provided by a media content storage and streaming provider 124. The media content storage and streaming provider 124 may include a reports and analytics module 990, an encoding module 950, a media content management services module 952, a media store application programming interface module 992, a media store services module 994, storage clusters 909 and streaming servers 919. The reports and analytics module 990, the encoding module 950, and the media content management services module 952 (e.g. VMS) use the media store application programming interface (API) 992 to use media store services 994. The media store API 992 provides calls that support a number of functions including, but not limited to: content ingestion, content status, content deletion, playlist ingestion, and set default asset. Media content is transcoded by the encoding module 950 to particular formats used by the media content storage and streaming provider 124. Optionally, media content that has already been encoded may bypass the encoding module 950. The media content management services module 952 may manage how media content is addressed and distributed throughout the media content storage and streaming provider 124.

A "media store" as referred to herein includes storage 911*a-n* on the storage clusters 909 as well as the media caches 921*a-n* on the streaming servers 919. Media store components are responsible for content ingestion and replication across the POPs 932*a-n*. Media store components are also responsible for moving content between the storage clusters 909 and the media caches 921*a-n* on the streaming servers 919. The media store services 994 may include a content replication module 996, staging module 998, media ingestor 905, and a work queue 903. The content replication module 996 may replicate content from a media content provider 102 into the staging module 998. The staging module 998 may store media content in staging storage 901 *a-n*. At that point, the media ingestor 905 creates an entry in the work queue 903. The work queue 903 may be a database that includes a number of work items. For example, the work queue 903 includes a list of media content to be ingested into the storage clusters 909 and/or streaming servers 919. Other work items may also be included in the work queue 903 (e.g. a particular piece of media content needs to be replicated to another storage server, to another POP, etc.). The media ingestor 905 moves media content from staging storage 901 *a-n* into the storage clusters 909 and/or the streaming servers 919 (of one or more POPs 932*a-n*). It 905 may also distribute the media content throughout the storage clusters 909 and/or the streaming servers 919 based on rules specified by a media content provider 102. For example, when a media content provider 102 anticipates a particular piece of media content to be popular in certain regions, the media content provider 102 may dictate that the media content should be distributed on certain POPs 932*a-n*. It may also be anticipated that a particular piece of media content will be heavily requested. According to media content provider 102 rules, the media content should be placed on one or more streaming servers 919.

The media ingestor 905 may provide a playlist 907 along with the media content. The playlist 907 includes a listing of files associated with a piece of media content. For example, the playlist 907 may include a listing of different video/audio format files (e.g. different resolutions, bitrates, different file formats such as Windows Media®, Flash®, etc.), audio files (e.g. different language audio files associated with video content, etc.), subtitle files, etc.

The storage clusters 909 include storage 911 *a-n* modules for one or more POPs 932*a-n*. Each storage module 911*a-n* include a store 913*a-n* and a cache 915*a-n*. The streaming servers 919 may include one or more media caches 921 *a-n*. The streaming servers 919 may interact with one or more synchronization daemons 917*a-n* (i.e. Labeled "syncd" in FIG. 9 for convenience). The synchronization daemons 917*a-n* may be responsible for replicating popular media content into the media caches 921 *a-n*. This may provide an improvement in streaming performance. The synchronization daemons 917*a-n* are software components that are configured to use traffic statistics obtained from the streaming servers 919 and/or a media content profile (e.g. whether a video is expected to have a large number of streaming views or whether it is a long tail limited view content) to determine what media content needs to be available in the streaming server 919 media caches 921*a-n*.

While the media caches 921 *a-n* may contain frequently accessed media content, the media content will also be available at a storage cluster 909 "home" location. This "home" location may be identified by a content ID or URL. During ingestion, the media content is placed on a "home" storage cluster and other clusters 909. Content may or may not be placed into the media cache 921 on streaming servers 919 during ingestion. The media content storage and streaming provider 124 may rely entirely on the media cache synchronization daemons 917*a-n* to selectively move and synchronize high demand content to the streaming server 919 media caches 921 *a-n* based on viewing statistics and demand for the content. Alternatively, the system may rely on media content provider-specific replication rules in addition to the media cache synchronization daemons 917*a-n* in order to govern content ingestion and replication. That is, content ingestion and replication may be based on media content provider-specific replication rules that support replication of content directly across multiple storage clusters 909 in different POPs 932*a-n*. Furthermore, content that is expected to be in heavy demand may be placed in the streaming server media caches 921*a-n* according to the media content provider-specific replication rules in order to improve performance. Accordingly, a media content provider 102 may set a profile of specific content as likely to have high demand. When this content is ingested, the media ingestor may recognize the content as likely to have high demand and may place the content in a home storage cluster and directly replicate the content to a number of streaming servers 919.

Figure 10:
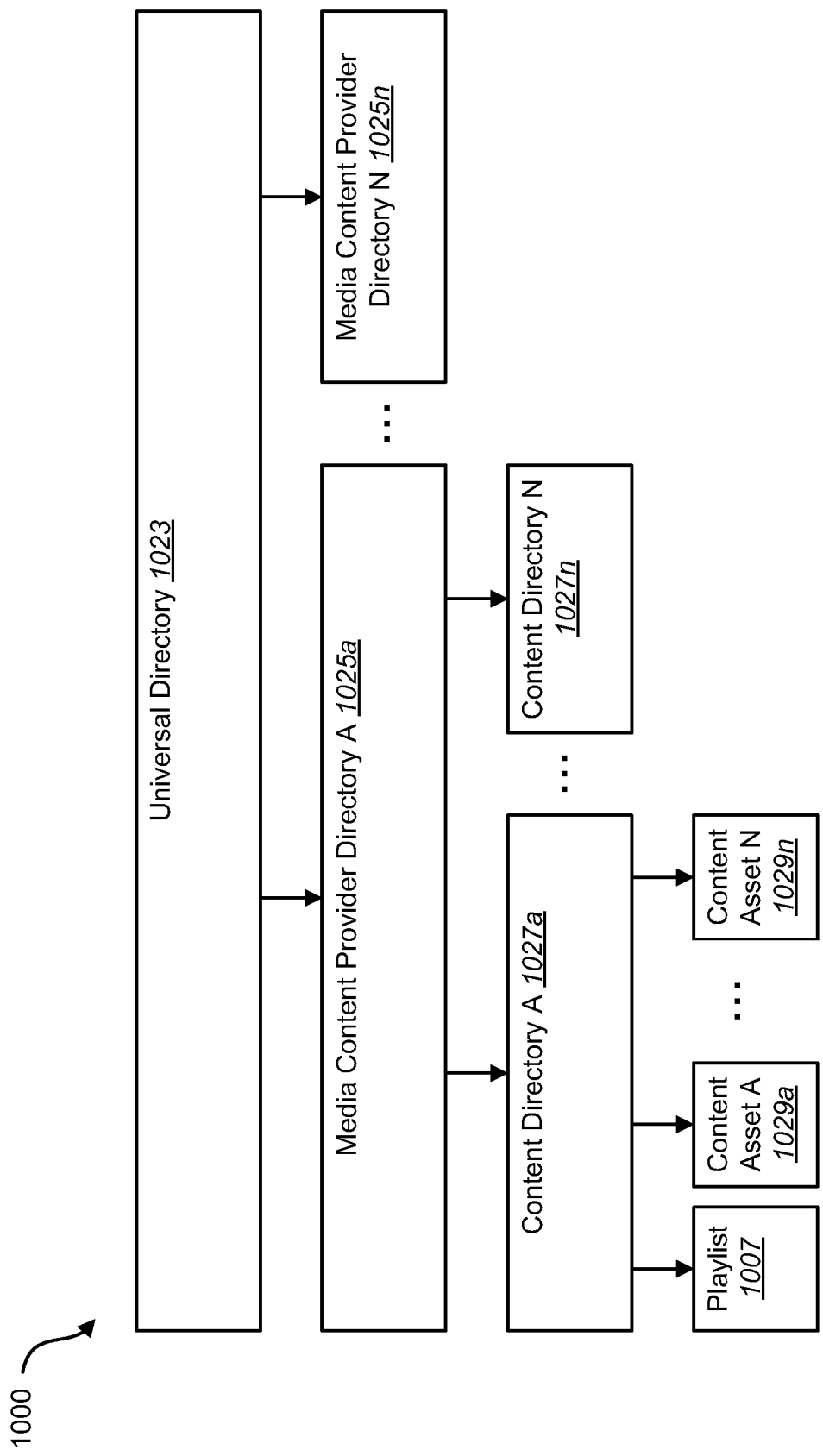
FIG. 10 is a block diagram illustrating a directory structure according to one exemplary embodiment of the principles described herein.

FIG. 10 is a block diagram illustrating a directory structure 1000. Media content storage may be implemented as a set of file system folders or directories on the storage tier 636 servers 658a-n and/or the streaming tier 638 streaming servers 664a-n. Each cluster 656a-n and/or storage server 658a-n may have a base path where the media storage is mounted. For example, media storage may be mounted as /www/M0002. M0002 is a universal cluster ID or directory 1023 that is used to mount storage on all storage servers 658a-n. Even though individual cluster IDs are assigned to storage servers 658a-n, these IDs may not be used internally while mapping storage. Consequently, the software components of the media content storage and streaming provider 124 may be cluster agnostic. Logical universal directories 1023 are used. For example, M0000 may be used for the server caches 676a-n on the streaming servers 664a-n, M0001 may link to content mounted on remote clusters, M0002 may be used for storage on the storage servers 658a-n, 660a-n (on the storage tier 636), and M0003 may be used for a statistics collection area. Media content addresses may be the same on both the storage tier 636 and the streaming tier 638, except that the universal directory (e.g. M000, M0002) 1023 may be different. There may be a separate media content provider directory 1025a-n for each media content provider 102 on a universal directory 1023. All content owned by a media content provider 102 may be placed in that media content provider's directory. The media content provider's directory (e.g. "folder") may be named using a media content provider's ID assigned to the media content provider.

Each media content provider directory 1025a-n may include one or more content directories 1027a-n. Each piece of media content is placed in a single content directory. That is, each content directory 1027a-n includes only files associated with a single piece of media content. For example, all of the files associated with a particular video (e.g. different formats, different resolutions, subtitles, audio tracks, etc.) might be placed in a content directory A 1027a for that particular video. Each of the content directories 1027a-n are named using a content ID assigned to the media content by the media content management system 452 (e.g. VMS) during ingestion. A content directory 1027a may include a playlist file 1007 and one or more content asset files 1029a-n (e.g. for video, audio, sub-titles, etc.). For example, the playlist file 1007 may be named "1st" and placed in the content directory A 1027a. Content assets 1029a-n may be files associated with a particular piece of media content. For example, assets may be video files, audio files, subtitle files, etc. Each content asset 1029a-n for a given piece of media content may have a unique content asset ID. Content asset files 1029a-n are placed in a content directory 1027a (e.g. "folder"). Each content asset file may have an entry in the playlist file 1007 that specifies the type of asset, bit rate and so on. This information is used by the media player 414 for playback.

Figure 11:
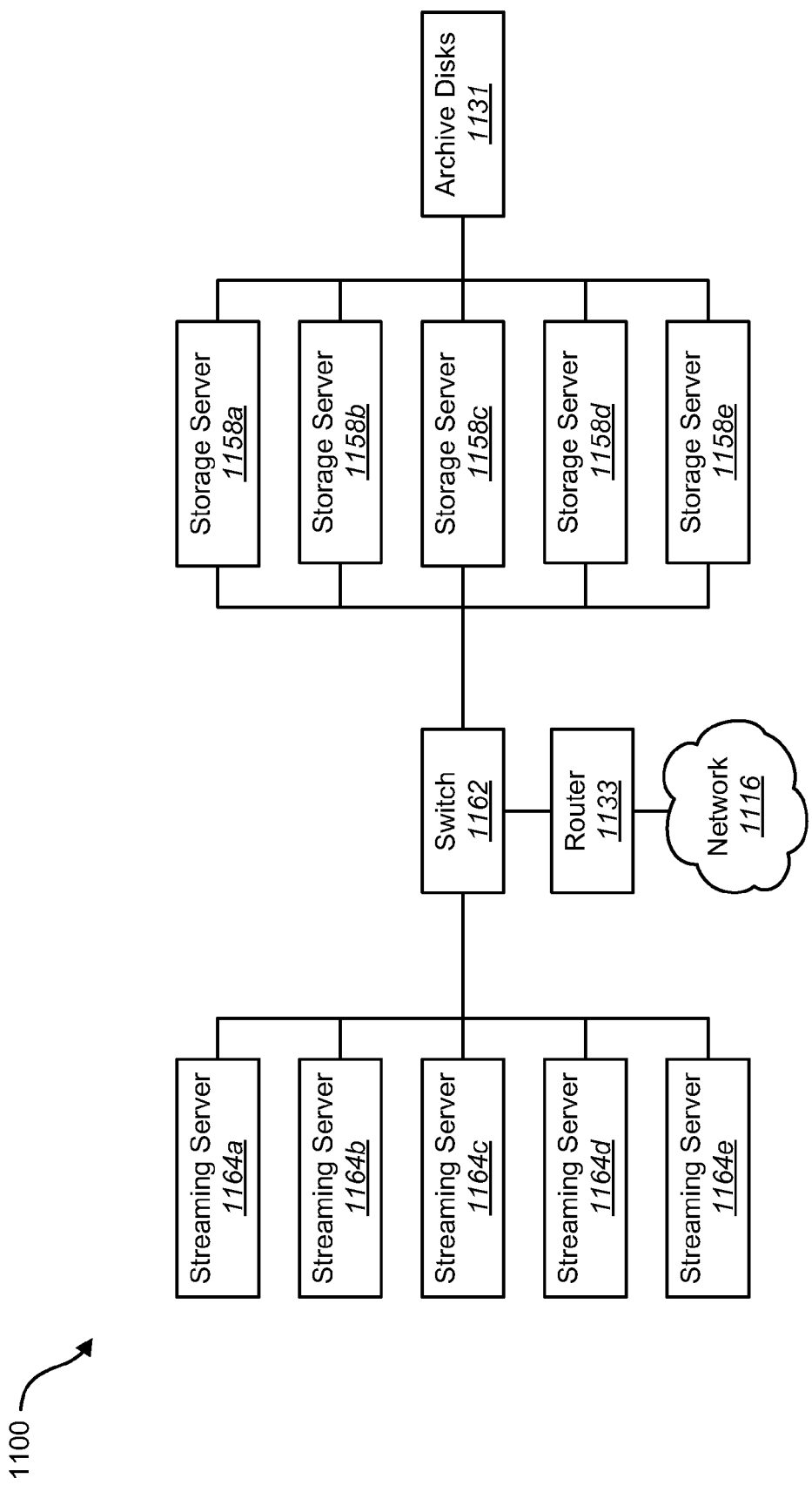
FIG. 11 is a block diagram illustrating various components that may be used in a media content storage and streaming provider according to one exemplary embodiment of the principles described herein.

FIG. 11 is a block diagram illustrating various components 1100 that may be used in a storage structure for streaming media content. The storage structure may include archive disks 1131, one or more storage servers 1158a-e, a switch 1162, one or more streaming servers 1164a-e, and a router 1133. The archive disks 1131 may include many disks used for storing electronic data. In particular, the archive disks 1131 may include one or more nodes ("bricks") in a storage cluster of disks. The archive disks 1131 may be mounted in a rack. The archive disks 1131 are connected to the storage servers 1158. The storage servers 1158 are computing devices used to receive, store, and transmit electronic data. The switch 1162 is an electronic device used to connect other electronic devices on a network. The streaming servers 1164 are electronic devices used to receive, store, and transmit electronic data. The streaming servers 1164 may be housed in neighboring racks and/or rack slots. The storage servers 1158 may be included in neighboring racks and/or rack slots. One or more of the streaming servers 1164 may be included in racks and/or rack slots neighboring one or more of the storage servers 1158. The archive disks 1131 may be included in racks and/or rack slots neighboring the storage servers 1158 and/or the streaming servers 1164. Furthermore, one or more of the streaming servers 1164, the switch 1162, the router 1133, one or more of the storage servers 1158a, and/or the archive disks 1131 may also be included in neighboring racks.

The streaming servers 1164 and storage servers 1158 are connected to the switch 1162. The switch 1162 may be connected to a router 1133. The router 1133 may be an electronic device used to route data between electronic devices on a network. The router 1133 may be connected to a network 1116 (e.g. intranet, the Internet). Although only five storage servers 1158a-e and five streaming servers 1164a-e are illustrated in FIG. 11, many more storage servers 1158 and streaming servers 1164 may be included in a storage structure for streaming media content. Although only one switch 1162 and one router 1133 are illustrated in FIG. 11, many more switches 1162 and routers 1133 may be included in a storage structure for streaming media content. Additionally, although only one block is used to illustrate the archive disks 1131 in FIG. 11, many collections or "bricks" of archive disks may be included in a storage structure for streaming media content.

Figure 12:
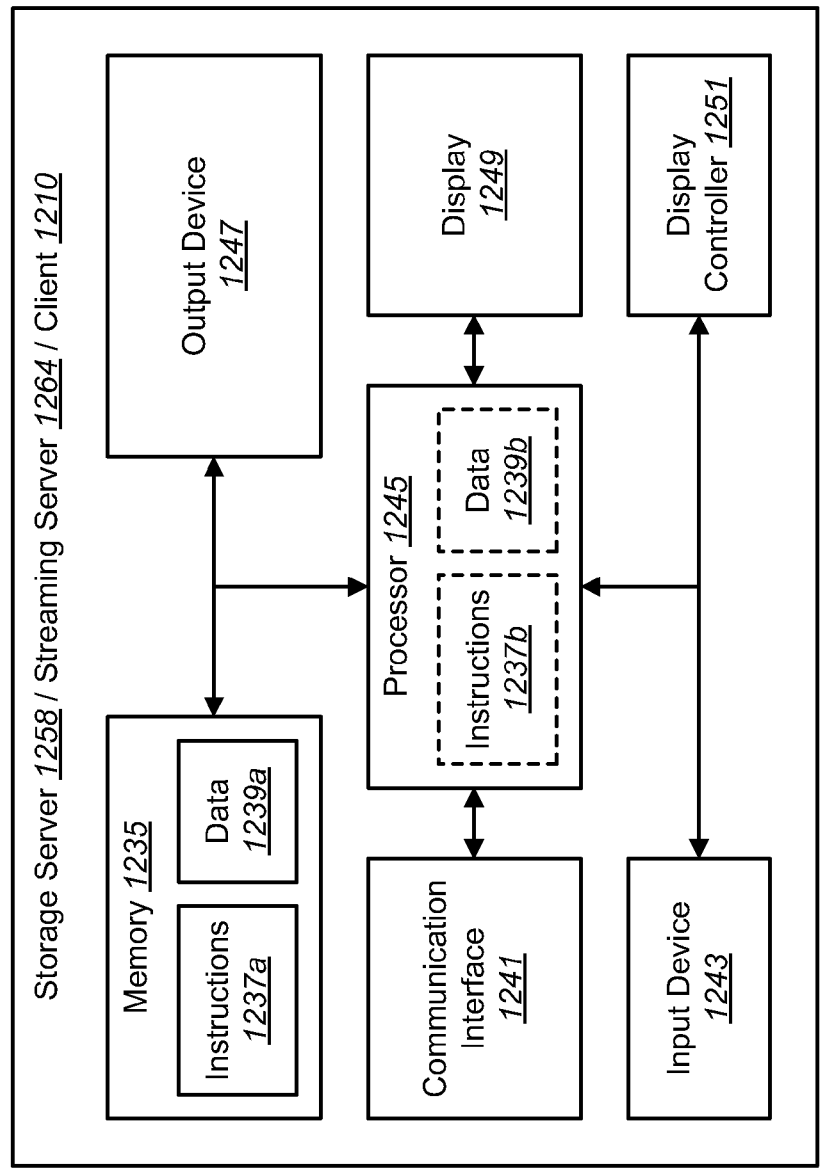
FIG. 12 illustrates various components that may be utilized in a storage server, streaming server, and/or client according to one exemplary embodiment of the principles described herein.

FIG. 12 illustrates certain components 1200 that may be included in a storage server 1258, streaming server 1264, and/or client 1210. The illustrated components may be located within the same physical structure or in separate housings or structures.

The storage server 1258, streaming server 1264, and/or client 1210 include a processor 1245 and memory 1235. The memory 1235 may include instructions 1237a and data 1239a. The processor 1245 controls the operation of the storage server 1258, streaming server 1264, and/or client 1210 and may be a general purpose single- or multi-chip processor, a special purpose processor (e.g. a digital signal processor (DSP)), a microcontroller, a programmable gate array, etc. The processor 1245 may be referred to as a central processing unit (CPU). Although just a single processor 1245 is shown in the storage server 1258, streaming server 1264, and/or client 1210 of FIG. 12, in an alternative configuration, a combination of processors could be used. The processor 1245 typically performs logical and arithmetic operations based on program instructions 1237b and/or data 1239b stored (1237a, 1239a) within the memory 1235.

The storage server 1258, streaming server 1264, and/or client 1210 also include memory 1235 in electronic communication with the processor 1245 (i.e., the processor 1245 can read information from and/or write information to the memory 1235). The memory 1235 may be any electronic component capable of storing electronic information. The memory 1235 may be a random access memory (RAM), read only memory (ROM), magnetic disk storage media, optical storage media, flash memory devices in RAM, on-board memory included with the processor, programmable read-only memory (PROM), erasable programmable read only memory (EPROM), electrically erasable PROM (EEPROM), registers, and so forth, including combinations thereof.

Data 1239 and instructions 1237 may be stored in the memory 1235. The instructions 1237 may include one or more programs, routines, sub-routines, functions, procedures, etc. The instructions 1237 may include a single computer-readable statement or many computer-readable statements. The instructions 1237 may be executable by the processor 1245 to implement the methods that are described herein. Executing the instructions 1237 may involve the use of the data 1239 that is stored in the memory 1235. FIG. 12 shows some instructions 1237*a* and data 1239*a* being loaded into the processor 1245.

The storage server 1258, streaming server 1264, and/or client 1210 typically may include one or more communication interfaces 1241 for communicating with other electronic devices. The communication interfaces 1241 may be based on wired communication technology, wireless communication technology, or both. Examples of different types of communication interfaces 1241 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The storage server 1258, streaming server 1264, and/or client 1210 typically may include one or more input devices 1243 and one or more output devices 1247. Examples of different kinds of input devices 1243 include a keyboard, mouse, microphone, remote control device, button, joystick, trackball, touchpad, lightpen, etc. Examples of different kinds of output devices 1247 include a speaker, printer, etc. One specific type of output device which may be typically included in a computer system is a display device 1249. Display devices 1249 used with the configurations disclosed herein may utilize any suitable image projection technology, such as a cathode ray tube (CRT), liquid crystal display (LCD), light-emitting diode (LED), gas plasma, electroluminescence, or the like. A display controller 1251 may also be provided, for converting data stored in the memory 1235 into text, graphics, and/or moving images (as appropriate) shown on the display device 1249.

Of course, FIG. 12 illustrates only one possible configuration of a storage server 1258, streaming server 1264, and/or client 1210. Various other architectures and components may be utilized.

Figure 13:
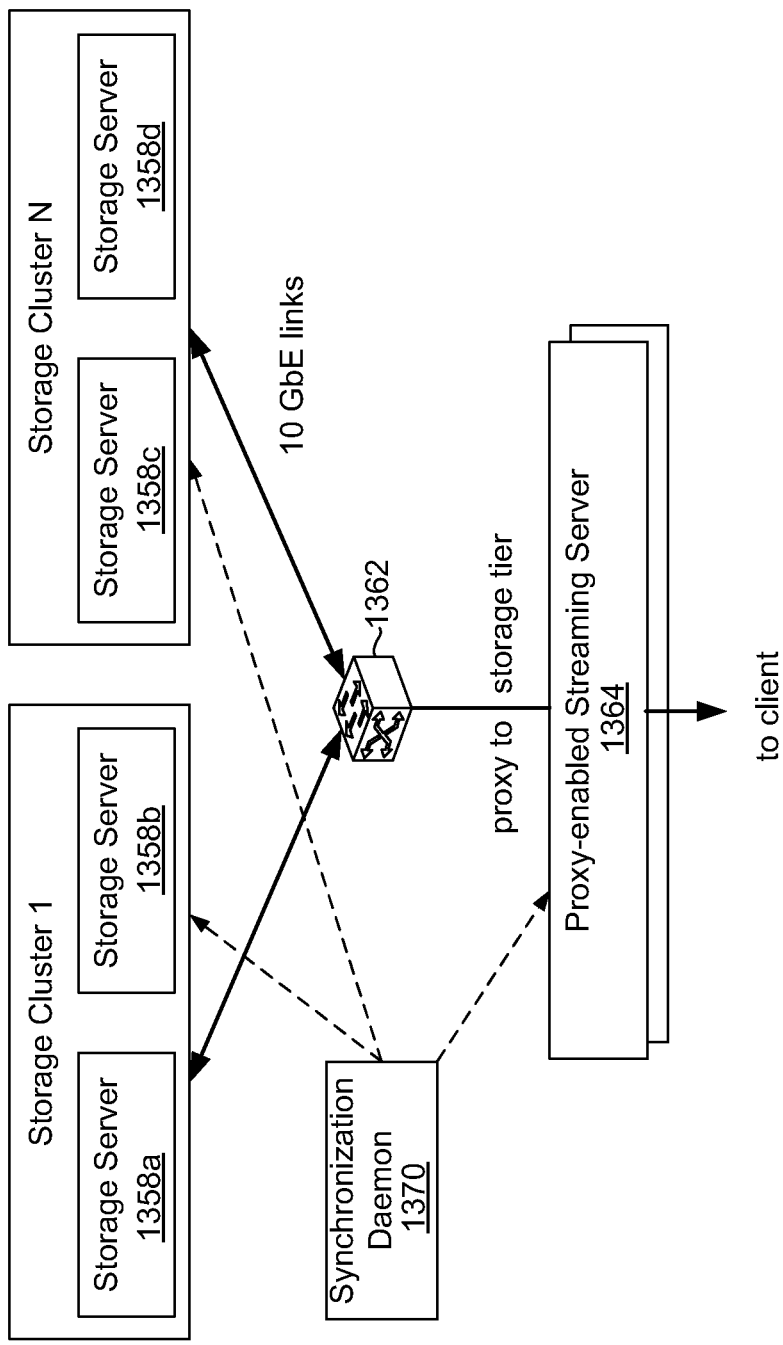
FIG. 13 is a block diagram illustrating a portion of a multi-tiered architecture for streaming media content in which a server located at a streaming tier acts as a reverse proxy to various servers located at a storage tier, according to one exemplary embodiment of the principles described herein.

FIG. 13 illustrates a portion of a multi-tiered architecture for streaming content consistent with the above principles in which a streaming server 1364 located on the streaming tier of the architecture may act as a reverse proxy for one or more storage servers 1358*a-d* located on the storage tier of the architecture, according to one exemplary embodiment of the principles described herein.

As with previously described embodiments, storage servers 1358*a-e* and the streaming server 1364 are communicatively coupled through a network switch 1362. In the present example of FIG. 13, the storage servers 1358*a-e* and streaming server 1364 are interconnected through mutual 10 Gb Ethernet connections to the network switch 1362.

The streaming server 1364 may have optimized hardware and software for fast streaming of content. For example, the streaming server 1364 may run highly specialized server software designed for streaming performance. As such, in certain embodiments the streaming server 1364 may have more local cache storage (e.g., RAM) and less disk-based storage than the storage servers 1358*a-e*. Consequently, where the streaming server 1364 may have a significantly greater capacity for streaming throughput than the storage servers 1358*a-e*, the storage servers 1358*a-e* may have a much greater volume of capacity for storage.

Thus, while a synchronization daemon 1370 of the media content management services implemented in the architecture may cause certain media content stored on the storage servers 1358*a-d* to be replicated on the streaming server 1364, the possibility remains that a client may request media content that is only available from the storage servers 1358*a-d*. In particular, a streaming server 1364 may only replicate the most popular media content and/or media content that has been specifically designated for replication by the streaming server 1364. However, by virtue of the fact that not all media content available from the architecture may be stored locally by the streaming server 1364, the streaming server 1364 may on occasion rely on media content stored by the storage servers 1358*a-d* to fulfill client requests. In such cases, the streaming server 1364 may either return an error to the client, redirect the client to one of the storage servers 1358*a-3*, or forward a request for content received from the client to one or more of the storage servers 1358*a-e* by reverse proxy.

In certain embodiments, the streaming server 1364 may be a lightweight asynchronous server designed to efficiently serve small static content (i.e., 128K to 2M video file portions). To improve server performance, certain embodiments of the streaming server 1364 may not support dynamic content applications, such as Fast-CGI, PHP, or any other CGI application. Rather, the streaming server 1364 may be optimized to simply process client requests for portions of media content files and deliver the requested portions. As described above, these client requests may be in the form of simple HTTP GET requests such that the streaming server 1364 relies on intelligent clients to perform load-balancing, flow-control, and maintain end-to-end QOS during video streaming. By shifting this processing functionality to the intelligent clients, the requirements of the streaming server 1364 may be significantly simplified, thereby improving the efficiency and throughput of the streaming server 1364.

An additional benefit of the streaming server 1364 may be the use of co-routines instead of separate processes or threads in the front-end processing of the streaming server 1364 for server-client connection control. Separate processes or threads in this context may incur significant overhead during setup and tear down operations. By contrast, co-routines are lightweight and non-preemptive. Furthermore, co-routines incur negligible system overhead, as they do not block or wait on I/O events. Rather, co-routines become suspended, yield to another co-routine, and eventually become rescheduled.

The use of co-routines rather than separate threads or processes in the front-end processing of the streaming server 1364 may further provide the advantage of preventing locking, due to the fact that co-routines do not execute concurrently.

In certain embodiments, the size of the co-routine stack in the streaming server 1364 may be fixed, and therefore the operating system of the streaming server 1364 must configure the stack wisely to avoid any potential stack overflow issue. By reducing or eliminating the need to manipulate user space buffers, the amount of co-routine stack required by the streaming server 1364 may be kept low. For example, in certain embodiments of streaming servers 1364, the co-routine stack memory requirement may be as low as 64K on a Linux operating system and 1 MB or lower for a Sun/Solaris operating system.

Additionally, by implementing the functionality of the streaming server 1364 in compact code written in a programming language selected for speed, the functionality of the streaming server 1364 may be further streamlined. For example, in one embodiment the asynchronous server functionality may be implemented in around 6500 lines of code written in 'C' for speed. Such embodiments have been shown to handle up to 50,000 concurrent client connections while consuming a rather small amount of memory (i.e., less than 100 MB).

Figure 14:
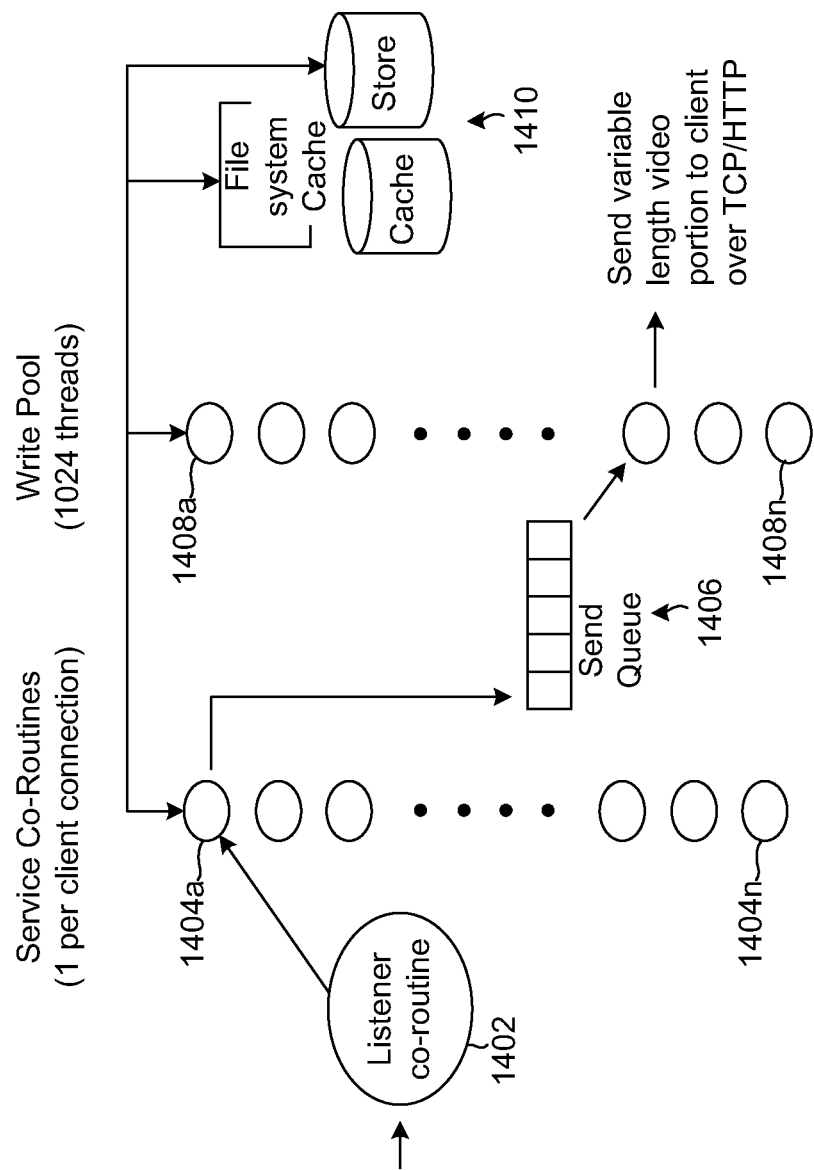
FIG. 14 is a block diagram illustrating a server located at a streaming tier streaming locally stored content to clients, according to one exemplary embodiment of the principles described herein.

FIG. 14 illustrates the functionality of an illustrative streaming server 1364 during the streaming of locally stored media content, according to one exemplary embodiment of the principles described herein.

At the front end of the streaming server 1364, a listener co-routine 1402 listens on the network socket and creates a new service co-routine 1404 each time an incoming connection is handled. The co-routine objects and stack objects are dynamically allocated and stored into a pool and are reused rather than destroyed to avoid any unnecessary dynamic allocation overhead. The co-routine front-end sub-system is completely event-driven, and based on non-blocking asynchronous I/O. According to one exemplary embodiment, the co-routing front-end sub-system relies on the epoll( ) system call for efficient I/O event scheduling. Epoll is a variant of poll that can be used either as Edge or Level Triggered interface and scales well to large numbers of watched file descriptors.

In the present exemplary system, front-end service co-routines 1404a-n are responsible for parsing the client requests, locating the files referenced in the requests, checking permissions associated with the requests, and enqueuing write or sendfile( ) jobs directly to a send queue 1406. According to one embodiment, a service co-routine 1404a-n first looks for the requested media content file of a client request in the file system cache or storage of the local storage 1410 in the streaming server. Upon finding the requested media content file, the service routine 1404a-n opens the file and saves the open state file descriptor in the connection object and sets-up kernel read ahead if supported. Read ahead functionality is where the kernel preemptively prepares additional portions of requested file for sending in anticipation that those portions will also be requested by the same client. Additionally, according to one embodiment, the system is further optimized by keeping file descriptors 'open' during the lifetime of a persistent connection (i.e. HTTP 1.1. has been negotiated with the client).

The service co-routine 1404a-n may also fully validate the request attributes and return a 400 or a 500 HTTP error code if the received request is invalid or not formatted properly. If the requested byte-range in the 206 bytes request is greater than the end of file and or not able to be satisfied, the service co-routine 1404a-n will return a 416 HTTP error response.

Once the service co-routine 1404a-n has fetched the metadata for a particular media content data file such as a video, the service co-routine then creates a Linux sendfile( ) (or equivalent) job and en-queues job on a send queue 1406. Once queued up, the submitted job is taken by one of a plurality of back-end write worker threads 1408a-n which perform the sendfile( ) job, thereby sending the requested portion of the media content file to the client over TCP/HTTP.

The sendfile( ) command in Linux and equivalent commands in other operating system kernels are used to send requested data directly from a local storage location to a TCP socket. This sending of the data is implemented within the kernel, and can therefore be performed without first copying the requested data to an intermediate location. As such, by using sendfile( ) and its equivalents in other operating systems, a streaming server may implement a zero-copy policy for streaming locally stored data from host memory into network card buffers. Locally stored data to be transferred may be taken directly from system buffers (4K pages), without context switching, and without trashing the cache. Because copying data to intermediate locations typically consumes significant resources, the use of sendfile( ) and its equivalents to implement zero-copy policies greatly enhances the efficiency and speed of the streaming server. Furthermore, as will be described in more detail below, the present specification provides novel methods to implement sendfile( ) and its equivalents when serving data from a separate server by reverse proxy such that the streaming server implements a one-copy policy when serving remotely stored data to the client.

In certain embodiments, TCP_CORK in Linux may be used to prevent queued partial frames from being sent to the TCP socket while data for the frames is still being retrieved from local storage.

Figure 15:
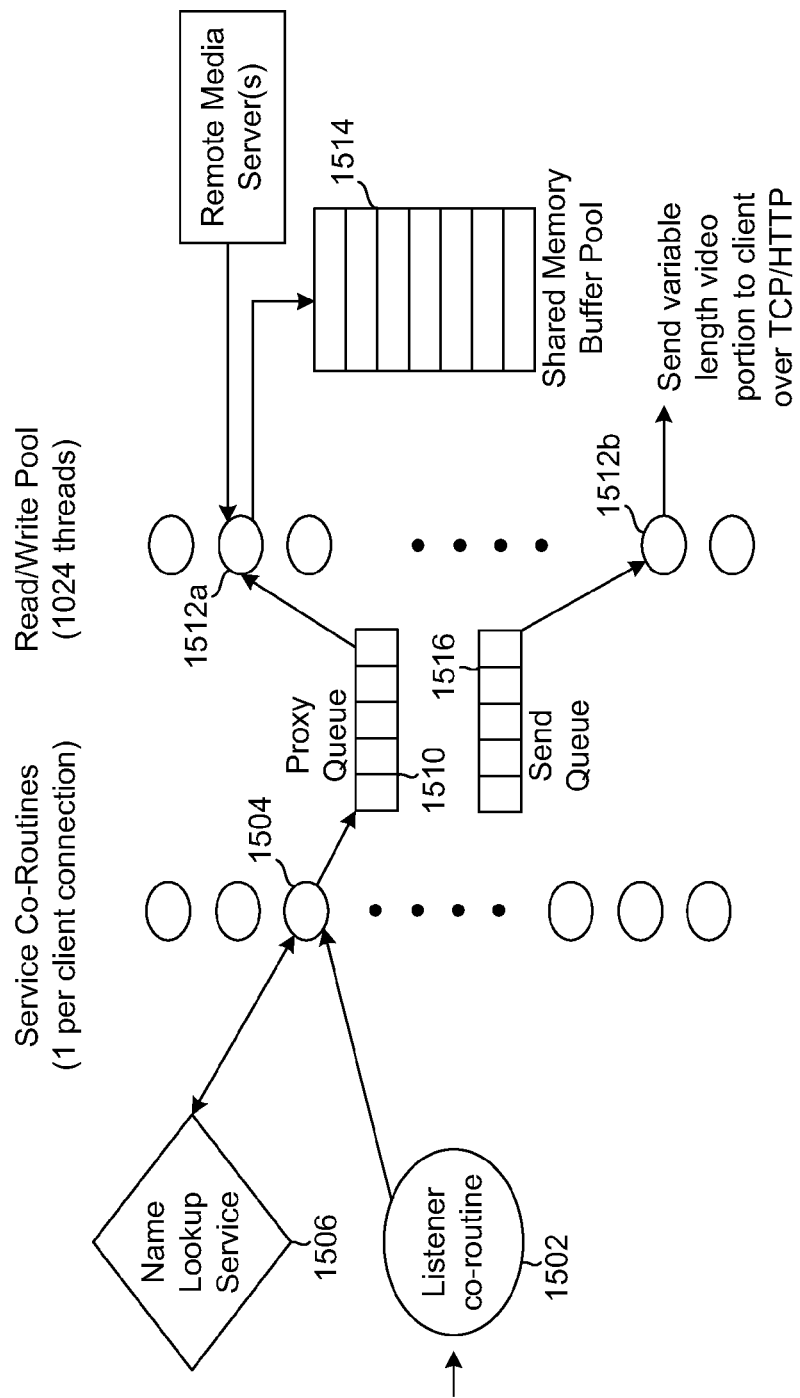
FIG. 15 is a block diagram illustrating a server located at a streaming tier acting as a reverse proxy to one or more servers located at a storage tier to stream media content to clients, according to on exemplary embodiment of the principles described herein.

FIG. 15 illustrates the functionality of an illustrative streaming server 1364 during the streaming of media content by reverse proxy from a different server to a client, according to one exemplary embodiment of the principles described herein.

As described above, it may be the case that a media content file requested by a client is not stored locally by a streaming server that receives the request. In certain embodiments, the streaming server may be configured to act as a reverse proxy for one or more servers located on the storage tier to implement a more autonomous system and avoid sending the client an error message.

In proxy mode, the listener co-routine 1502 assigns an incoming client request to a new service co-routine 1504, which first searches local storage for the requested media content file. If the file is not found locally, the service co-routine 1504 queries a name lookup service 1506 for the location of the file on the architecture of interconnected servers and initiates a proxy connection to a remote resource 1508 that stores the requested file. The name lookup service 1506 may maintain a map of all resources stored in the architecture and be able to map URLs received from clients to media storage server or cluster names or IP addresses. The name lookup service 1506 may work in conjunction with a management system of the architecture to maintain the resource map.

The remote resource 1508 may be a single server or a cluster of servers at, for example, a storage tier of the architecture. If the data has been replicated and several copies of the requested file exist across the architecture, the service co-routine 1504 may proxy to each resource storing the requested file in a round-robin fashion to balance the load across multiple back-end systems. The query to the remote resource(s) 1508 may be based on the data content URL received from the client or player.

Once the service routine 1504 has successfully established a connection to a remote resource by reverse proxy, the service routine 1504 may enqueue a proxy job for that resource, related to the client request, on a proxy queue 1510, where the proxy job will be retrieved from the proxy queue 1510 by a back-end thread 1512a that polls for available data on the proxy connection and copies the HTTP response (header and payload) from the remote resource(s) 1508 to a shared memory buffer pool 1514. The shared memory buffer pool 1514 uses shared memory in the kernel, which is faster than the standard file system implemented by the streaming server for locally stored media content. Locations in the shared memory buffer pool 1514 may be mapped to addresses within the local file storage system. In this way, sendfile( ) may be used to transmit the data from the remote resource(s) 1508 directly to the client through the TCP socket without requiring additional copying of the data.

Now that the requested portion of the specified media content file is in shared memory, a new sendfile( ) or equivalent job may be enqueued in a send queue 1516 for the data, and a back-end thread 1512b may perform the sendfile( ) or equivalent job to transmit the requested portion of the specified media content file to the requesting client.

At present, sendfile( ) and its equivalents do not support socket-to-socket transmission of data. As such, the example described incurs a one-copy penalty when responding to a client request by reverse-proxy to a remote resource 1508. However, it will be readily apparent that a direct socket-to-socket transmission of reverse-proxy data further optimizes the performance of the streaming server. For example, in certain embodiments TCP splicing may be used to splice a TCP connection between the streaming server and the remote resource 1508 with a TCP connection between the streaming server and the client to produce an implementation in which the requested file portion is transmitted by reverse proxy directly to the client with a zero-copy penalty.

According to one exemplary embodiment, a proxy-enabled streaming server consistent with the above principles was able to achieve 9 Gbps of outbound throughput over a single 10 G physical interface, and 14 Gbps over dual 10 G interfaces with response time delays in the 10 ms range. Measurements were collected on Sun Cool-thread hardware running Solaris 10 with the streaming server rated at a 97% system efficiency level. Those figures apply to the case where most of the data comes out of memory. According to one exemplary embodiment, the proxy-enabled streaming server is configured to use the intrinsic least recently used (LRU) caching feature of the Linux Kernel. For this model to work well some higher entity must guarantee that popular or hot content is synced to the front-tier while less popular data (typically long pull) stays on the origin back-end server.

The streaming server may be configured to act as a reverse proxy via a flag in the httpd configuration. For example, an httpd configuration file for a streaming server consistent with the above principles may have the option to set a SRV_PROXY field to either 1 or 0, where 1 indicates that a proxy mode is enabled and 0 indicates that the proxy mode is disabled.

According to one exemplary embodiment, the following format may be used for the Uniform Resource Identifier (URI) received by the streaming server to identify a requested portion of a specified media content file:
http://C/clusterIDXCustomerIDXVideoID.Ext (is used for debugging)
http://C/
   g.php?f=clusterIDXCustomerIDXVideoIDXAssetID.Ext&B=XEYROM)
where:
B is the byte-range of the requested portion of the video
X is the starting_offset of the byte-range
Y is the ending_offset of the bye-range
C is the streaming server IP address (stripped by TCP)
X is a separator (1) (not a true separator but a "byte position")
clusterID (5) is a mount point (or link to it)
  M0000 local disk (rackable)
  M0001, M0002, M0003, M0004
  media cache, store, stats, staging areas on Rapidscale
  M1XXX storage cluster mount point (Rapidscale)
customerID (6)→used for stats
VideoID (8)→unique hash of the ingested video name Conventionally, to obtain a portion of a file from a server, an HTTP partial-GET request is utilized, which the server responds to with an HTTP 206 response. However, because partial-GET requests and 206 responses are suspect in many network firewalls, the use of partial-GET requests in a streaming server to retrieve client-specified portions of media content files may result in the certain client requests or the responses thereto being filtered by a firewall between the client and the streaming server. Thus, specifying the byte-range of the requested portion of the selected media content file directly in the URI provides the advantage of mitigating the risk that service to a client will be interrupted or prevented by a network firewall, in addition to consolidating the entire request within the URI itself.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer readable storage medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. The term "computer readable storage medium" expressly does not encompass a signal per se or any nontangible article.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for providing media content, comprising:
   receiving a request from a client for a portion of a selected media file in a streaming server at a streaming tier in a multi-tiered architecture for media content storage and streaming;
   streaming said requested portion of said selected media file to said client directly from said streaming server if said selected media file is stored on said streaming server; and
   streaming said requested portion of said selected media file to said client from said streaming server by reverse proxy to at least one server of a storage tier in said multi-tiered architecture if said media file is not stored on said streaming server,
   wherein said streaming said requested portion of said selected media file to said client from said streaming server by reverse proxy to said at least one server of said storage tier comprises:
      sending said requested portion of said selected file received from said at least one server of said storage tier to said client by splicing a network connection between said streaming server and said at least one server of said storage tier with a network connection between said streaming server and said client through an operating system kernel of said streaming server.

2. The method of claim 1, further comprising creating a new front-end service co-routine for said request in said streaming server with a listener co-routine.

3. The method of claim 2, wherein said front-end service co-routine is configured to determine at least one storage location of said selected media file on said multi-tiered architecture.

4. The method of claim 2, wherein said new front-end service co-routine is one of a plurality of front-end co-routines implemented by said streaming server, each of said front-end co-routines corresponding to a separate client request received by said streaming server.

5. The method of claim 4, wherein said co-routines are not executed concurrently by said streaming server.

6. The method of claim 2, further comprising creating said new front-end service co-routine out of at least one co-routine object previously allocated to a completed front-end service co-routine.

7. The method of claim 1, wherein said streaming said requested portion of said selected media file to said client directly from said streaming server if said selected media file is stored on said streaming server comprises:
   sending said requested portion of said selected file from local storage in said streaming server to a network port of said streaming server without performing any intermediate copies of said requested portion of said selected file.

8. The method of claim 1, wherein said streaming said requested portion of said selected media file to said client from said streaming server by reverse proxy to said at least one server of said storage tier comprises:
   copying said requested portion of said selected file to a local cache of said streaming server; and
   sending said requested portion of said selected file from said local cache of said streaming server to a network port of said streaming server without performing any intermediate copies of said requested portion of said selected file.

9. The method of claim 1, wherein said request from said client comprises a uniform resource identifier (URI) specifying an identification of said selected media file and a requested byte-range of said selected media file.

10. A streaming server in a multi-tiered architecture for media content and storage, said streaming server comprising:
    at least one processor; and
    at least one computer memory device communicatively coupled to said at least one processor;
    wherein said at least one processor is configured to, upon execution of executable code stored by said at least one computer memory device:
       receive a request from a client for a portion of a selected media file;
       stream said requested portion of said selected media file to said client directly if said selected media file is stored on said streaming server; and
       stream said requested portion of said selected media file to said client from said streaming server by reverse proxy to at least one server of a storage tier in said multi-tiered architecture if said media file is not stored on said streaming server,
       wherein said streaming said requested portion of said selected media file to said client by reverse proxy to said at least one server of said storage tier comprises:
          said at least one processor sending said requested portion of said selected file received from said at least one server of said storage tier to said client by splicing a network connection between said streaming server and said at least one server of said storage tier with a network connection between said streaming server and said client through an operating system kernel of said streaming server.

11. The streaming server of claim 10, wherein said at least one processor is further configured to create a new front-end service co-routine for said request with a listener co-routine.

12. The streaming server of claim 11, wherein said front-end service co-routine is configured to determine at least one storage location of said selected media file on said multi-tiered architecture.

13. The streaming server of claim 11, wherein said new front-end service co-routine is one of a plurality of front-end co-routines implemented by said streaming server, each of said front-end co-routines corresponding to a separate client request received by said streaming server.

14. The streaming server of claim 13, wherein said co-routines are not executed concurrently by said streaming server.

15. The streaming server of claim 11, wherein said new front-end service co-routine is created out of at least one co-routine object previously allocated to a completed front-end service co-routine.

16. The streaming server of claim 10, wherein said streaming said requested portion of said selected media file to said client directly if said selected media file is stored on said streaming server comprises said at least one processor sending said requested portion of said selected file from local storage in said streaming server to a network port of said streaming server without performing any intermediate copies of said requested portion of said selected file.

17. The streaming server of claim 10, wherein said streaming said requested portion of said selected media file to said client by reverse proxy to said at least one server of said storage tier comprises:
said at least one processor copying said requested portion of said selected file to a local cache of said streaming server; and
said at least one processor sending said requested portion of said selected file from said local cache of said streaming server to a network port of said streaming server without performing any intermediate copies of said requested portion of said selected file.

18. A computer program product, comprising:
a non-transitory computer readable storage medium, said non-transitory computer readable storage medium comprising computer readable program code embodied therewith, said computer readable program code comprising:
computer readable program code configured to receive a request from a client for a portion of a selected media file in a streaming server at a streaming tier in a multi-tiered architecture for media content storage and streaming;
computer readable program code configured to stream said requested portion of said selected media file to said client directly from said streaming server if said selected media file is stored on said streaming server; and
computer readable program code configured to stream said requested portion of said selected media file to said client from said streaming server by reverse proxy to at least one server of a storage tier in said multi-tiered architecture if said media file is not stored on said streaming server,
computer readable program code configured to stream said requested portion of said selected media file to said client from said streaming server by reverse proxy to at least one server of a storage tier comprises:
computer readable program code configured to send said requested portion of said selected file received from said at least one server of said storage tier to said client by splicing a network connection between said streaming server and said at least one server of said storage tier with a network connection between said streaming server and said client through an operating system kernel of said streaming server.

\* \* \* \* \*